(12) United States Patent
Oh et al.

(10) Patent No.: US 9,852,130 B2
(45) Date of Patent: Dec. 26, 2017

(54) MOBILE TERMINAL AND METHOD FOR CONTROLLING THE SAME

(71) Applicant: Samsung Electronics Co., Ltd., Gyeonggi-do (KR)

(72) Inventors: Young-Joon Oh, Seoul (KR); Jung-Hoon Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/453,171

(22) Filed: Aug. 6, 2014

(65) Prior Publication Data
US 2015/0046148 A1 Feb. 12, 2015

(30) Foreign Application Priority Data
Aug. 6, 2013 (KR) .......................... 10-2013-0093019

(51) Int. Cl.
| | |
|---|---|
| G06F 17/27 | (2006.01) |
| G06F 17/28 | (2006.01) |
| H04N 5/445 | (2011.01) |
| H04N 21/81 | (2011.01) |
| H04N 21/414 | (2011.01) |
| H04N 21/431 | (2011.01) |
| H04N 21/4402 | (2011.01) |
| H04N 21/488 | (2011.01) |

(52) U.S. Cl.
CPC .......... *G06F 17/289* (2013.01); *G06F 17/277* (2013.01); *H04N 5/44513* (2013.01); *H04N 5/44591* (2013.01); *H04N 21/41407* (2013.01); *H04N 21/4316* (2013.01); *H04N 21/440236* (2013.01); *H04N 21/4884* (2013.01); *H04N 21/8133* (2013.01); *H04N 2005/44526* (2013.01)

(58) Field of Classification Search
None
See application file for complete search history.

(56) References Cited

U.S. PATENT DOCUMENTS

| | | | |
|---|---|---|---|
| 5,543,851 A * | 8/1996 | Chang ................ | H04N 5/44513 348/468 |
| 6,208,383 B1 * | 3/2001 | Park ...................... | G09G 5/246 348/461 |
| 7,508,450 B1 * | 3/2009 | Abernethy, Jr. ... | H04N 5/44513 348/465 |

(Continued)

FOREIGN PATENT DOCUMENTS

| | | |
|---|---|---|
| KR | 20030077348 | 10/2003 |
| KR | 100762616 | 9/2007 |

(Continued)

*Primary Examiner* — Marcus T Riley
(74) *Attorney, Agent, or Firm* — The Farrell Law Firm, P.C.

(57) ABSTRACT

A method for controlling a mobile terminal is provided. The method includes receiving content data including video data; determining whether first caption data including a first language caption is included in the content data; determining, if the first caption data is included in the content data, whether a high-difficulty word is included in the first language caption; generating explanation data corresponding to the high-difficulty word if the high-difficulty word is included in the first language caption; and converting the first caption data into second caption data by adding the explanation data to the first caption data.

16 Claims, 25 Drawing Sheets

(56) References Cited

U.S. PATENT DOCUMENTS

| | | | |
|---|---|---|---|
| 8,248,528 B2* | 8/2012 | Hosking | H04N 7/165 348/461 |
| 2004/0034522 A1 | 2/2004 | Liebermann et al. | |
| 2006/0174315 A1 | 8/2006 | Kim et al. | |
| 2009/0012788 A1* | 1/2009 | Gilbert | G10L 21/06 704/235 |
| 2009/0185074 A1* | 7/2009 | Streijl | H04N 7/0885 348/468 |
| 2009/0313013 A1* | 12/2009 | Wen | G09B 21/009 704/235 |

FOREIGN PATENT DOCUMENTS

| | | |
|---|---|---|
| KR | 100819251 | 3/2008 |
| KR | 101093917 | 12/2011 |

* cited by examiner

MOBILE TERMINAL AND METHOD FOR CONTROLLING THE SAME

PRIORITY

This application claims priority under 35 U.S.C. §119(a) to Korean Patent Application Serial No. 10-2013-0093019, which was filed in the Korean Intellectual Property Office on Aug. 6, 2013, the entire disclosure of which is incorporated herein by reference.

BACKGROUND OF THE INVENTION

1. Field of the Invention

The present invention relates generally to a mobile terminal and a method for controlling the same, and more particularly, to a mobile terminal for allowing the hearing impaired to easily recognize technical terms included in a caption or emotions associated with the caption and a method for controlling the same.

2. Description of the Related Art

With the development of mobile communication technology, the number of smart phone users has recently increased, causing a massive increase in the amount of mobile communication-based content data (e.g., Digital Multimedia Broadcasting (DMB) TV-based content data). Among the users who watch broadcast programs on a mobile communication terminal such as the smart phone, viewers with hearing impairments may have many difficulties in using the smart phone, compared with non-disabled viewers.

In order to help the hearing impaired understand the content of a broadcast program, conventional broadcasting stations and/or service providers, which transmits a broadcast program, sometimes attach a caption to TV video data. For example, Korean patent application No. 10-0762616 discloses a DMB receiver that extracts caption data from broadcast video data information during the movement of a user, attaches the extracted caption data to the video data, and displays the caption-attached video data on a screen.

However, the general hearing impaired may require a long time in reading and understanding a caption, especially a technical term in the caption, since the hearing impaired tend to feel a sign language more familiar than characters. In addition, the hearing impaired may tend to have difficulty in recognizing emotions associated with a broadcast program, only with the caption.

Therefore, there is a need for a method in which the hearing impaired can easily recognize the technical term and easily recognize specific emotions that a caption desires to indicate.

The above information is presented as background information only to assist with an understanding of the present invention. No determination has been made, and no assertion is made, as to whether any of the above might be applicable as prior art with regard to the present invention.

SUMMARY OF THE INVENTION

The present invention has been made to address at least the above-mentioned problems and/or disadvantages and to provide at least the advantages described below.

Accordingly, an aspect of the present invention is to provide a mobile terminal for allowing the hearing impaired to easily recognize technical terms included in a caption or emotions associated with the caption, and a method for controlling the same.

In accordance with an aspect of the present invention, there is provided a method for controlling a mobile terminal. The method includes receiving content data including video data; determining whether first caption data including a first language caption is included in the content data; determining, if the first caption data is included in the content data, whether a high-difficulty word is included in the first language caption; generating explanation data corresponding to the high-difficulty word if the high-difficulty word is included in the first language caption; and converting the first caption data into second caption data by adding the explanation data to the first caption data.

In accordance with another aspect of the present invention, there is provided a method for controlling a mobile terminal. The method includes receiving content data including video data; determining whether first caption data including a first language caption is included in the content data; determining, if the first caption data is included in the content data, whether a high-difficulty word is included in the first language caption; generating a first language-based sign language animation corresponding to the high-difficulty word, if the high-difficulty word is included in the first language caption; and converting the first caption data into second caption data by adding the first language-based sign language animation to the first caption data.

In accordance with still another aspect of the present invention, there is provided a mobile terminal including a video receiver configured to receive content data including video data; and a controller configured to determine whether first caption data including a first language caption is included in the content data, determine, if the first caption data is included in the content data, whether a high-difficulty word is included in the first language caption, generate explanation data corresponding to the high-difficulty word if the high-difficulty word is included in the first language caption, and convert the first caption data into second caption data by adding the explanation data to the first caption data.

In accordance with yet another aspect of the present invention, there is provided a mobile terminal including a video receiver configured to receive content data including video data; and a controller configured to determine whether first caption data including a first language caption is included in the content data, determine, if the first caption data is included in the content data, whether a high-difficulty word is included in the first language caption, generate a first language-based sign language animation corresponding to the high-difficulty word, if the high-difficulty word is included in the first language caption, and convert the first caption data into second caption data by adding the first language-based sign language animation to the first caption data.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE PRESENT INVENTION

The following description with reference to the accompanying drawings is provided to assist in a comprehensive understanding of embodiments of the invention as defined by the claims and their equivalents. It includes various specific details to assist in that understanding but these are to be regarded as merely examples. Accordingly, those of ordinary skilled in the art will recognize that various changes and modifications of the embodiments described herein can be made without departing from the scope and spirit of the present invention. In addition, descriptions of well-known functions and constructions may be omitted for clarity and conciseness.

The terms and words used in the following description and claims are not limited to their dictionary meanings, but are merely used to enable a clear and consistent understanding of the present invention. Accordingly, it should be apparent to those skilled in the art that the following description of embodiments of the present invention is provided for illustration purposes only and not for the purpose of limiting the present invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
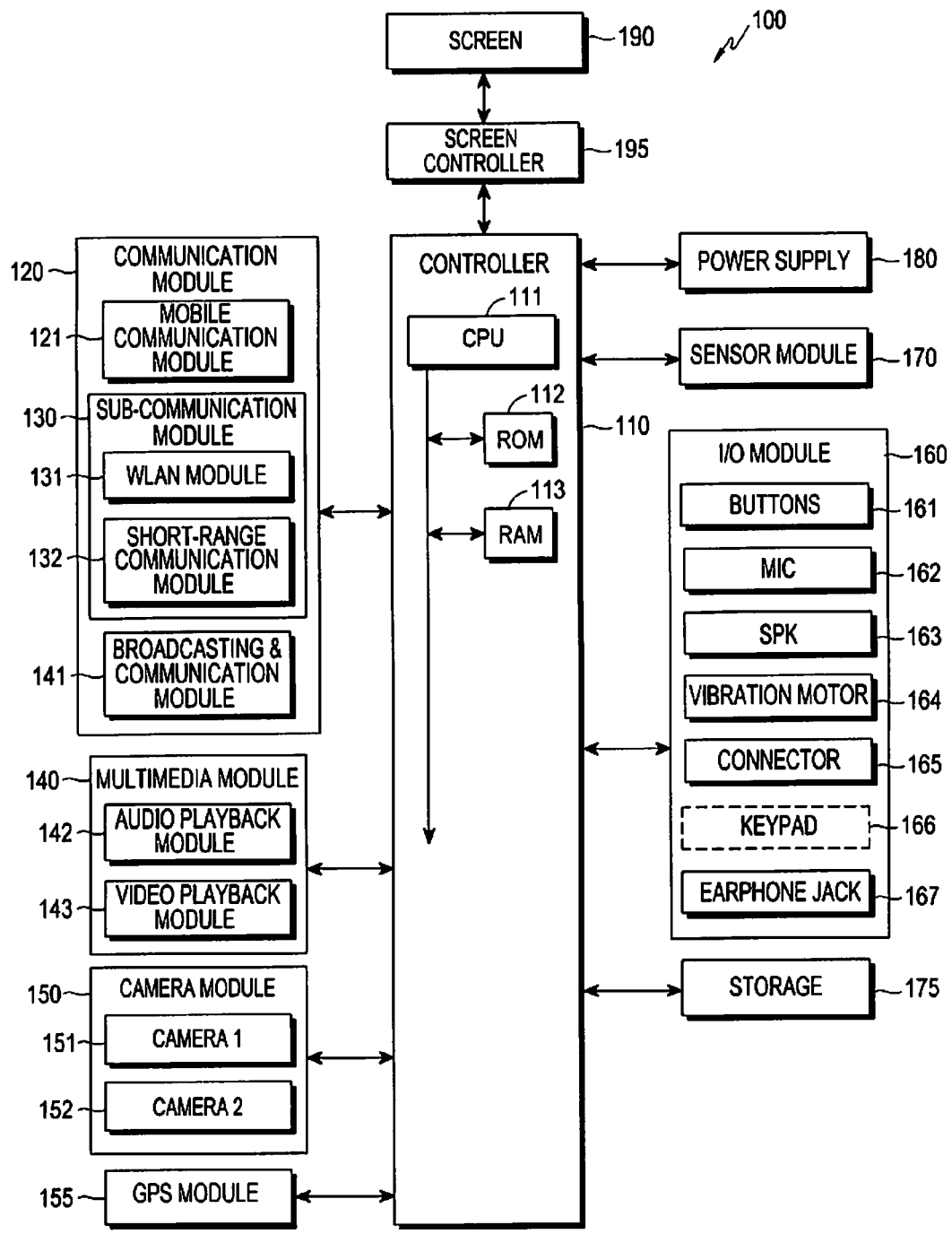
FIG. 1 is a block diagram illustrating a configuration of a mobile terminal, according to an embodiment of the present invention.

FIG. 1 is a block diagram, illustrating a configuration of a mobile terminal, according to an embodiment of the present invention.

Referring to FIG. 1, a mobile terminal 100 includes a controller 110, a mobile communication module 120, a storage 175, and a screen 190. The mobile terminal 100 may further include at least one of a sub-communication module 130, a multimedia module 140, a camera module 150, a Global Positioning System (GPS) module 155, an Input/Output (I/O) module 160, a sensor module 170, a power supply 180, and a screen controller 195.

The controller 110 includes a Central Processing Unit (CPU) 111, a Read Only Memory (ROM) 112 storing a control program for control of the mobile terminal 100, and a Random Access Memory (RAM) 113 that temporarily stores signals or data received from the outside of the mobile terminal 100, and is used as a workspace for an operation performed in the mobile terminal 100. The CPU 111 may include a single-core processor, a dual-core processor, a triple-core processor, a quad-core processor, or the like. The CPU 111, the ROM 112 and the RAM 113 may be interconnected via an internal bus.

The controller 110 controls the mobile communication module 120, the sub-communication module 130, the multimedia module 140, the camera module 150, the GPS module 155, the I/O module 160, the sensor module 170, the storage 175, the power supply 180, the screen 190 and the screen controller 195.

The controller 110 also controls the screen 190 to control various content data being displayed on the screen 190 or to control display of the content data. The controller 110 controls the mobile terminal 100 to perform an operation corresponding to a touch input (e.g., a user input) detected through the screen 190. If a touch input that a user touches at least one point of the screen 190 is made by the user on the screen 190, the controller 110 may control the mobile terminal 100 to perform an operation corresponding to the touch input.

The controller 110 according to an embodiment of the present invention controls the mobile communication module 120 to receive content data. If the mobile terminal 100 receives content data from other devices (e.g., a broadcasting station and the like), the controller 110 determines whether first caption data is included in the received content data. In this embodiment, the first caption data, which corresponds to a caption included in advance in content data, may be created by the broadcasting station or service provider that transmits or broadcasts the content data. If the first caption data is included in the content data, the controller 110 extracts the first caption data from the content data, and analyzes the extracted first caption data.

The controller 110 analyzes texts (e.g., a caption) included in the first caption data and converts the first caption data into second caption data. The controller 110 determines whether at least one high-difficulty word is included among the texts included in the first caption data. If the high-difficulty word is included, the controller 110 generates explanation data including an explanation for each of the high-difficulty words. The controller 110 converts the first caption data into the second caption data by adding the explanation data to the first caption data. When video data is displayed on the screen 190, the controller 110 controls the screen 190 so that the second caption data including the explanation data may be displayed together. In other words, the controller 110 controls the screen 190 to simultaneously display the first caption data and the explanation data.

In accordance with an embodiment of the present invention, the controller 110 translates a high-difficulty word or a sentence including the high-difficulty word into a sign language. The controller 110 generates a sign language animation based on the translated sign language. The sign language animation may include at least one of a first language-based sign language animation and a second language-based sign language animation. The controller 110 generates, as a first language-based sign language animation or a second language-based sign language animation, an animation for allowing an avatar stored in the storage 175 in advance to perform a sign language gesture. The controller 110 stores a first language-based sign language animation and a second language-based sign language animation generated to correspond to the high-difficulty word in a sign language Database (DB) 176 and a foreign language-based sign language DB 178 of the storage 175, respectively.

In accordance with an embodiment of the present invention, the controller 110 searches the storage 175 for a first language-based sign language animation or a second language-based sign language animation corresponding to the high-difficulty word. In order words, a first language-based sign language animation or a second language-based sign language animation corresponding to each of the high-difficulty words may have been stored in the storage 175. The controller 110 searches for a first language-based sign language animation or a second language-based sign language animation, which corresponds to a high-difficulty word included in the first caption data, and extracts the searched sign language animation from the storage 175. The controller 110 adds the searched first language-based sign language animation or second language-based sign language animation to the first caption data.

The first language may be the native language of the user of the mobile terminal 100. The first language may be set as a default language in the mobile terminal 100, and the mobile terminal 100 may display words in the first language unless instructed otherwise. In addition, the first language may be set as the default language by the user. A second language may be a language other than the first language. For example, if the first language is assumed as Korean, the second language may be English, French, Spanish or the like.

In accordance with another embodiment, if the mobile terminal 100 receives a broadcast signal from another terminal or a server, the first language may be a language of the country including the area where the broadcast signal is transmitted. For example, if the mobile terminal 100 receives a broadcast signal transmitted in South Korea, the first language may be Korean, and the second language may be a language (e.g., a foreign language such as English, Japanese, French, Spanish and the like) other than Korean.

In accordance with an embodiment of the present invention, sign language data corresponding to each of the high-difficulty words may be stored in the sign language DB 176 or the foreign language-based sign language DB 178. The sign language data may include, for example, the shape and the order of the sign language gesture corresponding to a specific word and may be data for explanation of the sign language gesture.

The controller 110 converts the first caption data into second caption data by adding the sign language animation to the first caption data. When video data is displayed on the screen 190, the controller 110 controls the screen 190 to display the second caption data including the sign language animation together. In other words, the controller 110 controls the screen 190 to simultaneously display the first caption data and the sign language data.

The mobile communication module 120, under control of the controller 110, connects the mobile terminal 100 to external devices using at least one antenna (not shown). The mobile terminal 100 may be connected to the external devices through mobile communication. The mobile communication module 120 may transmit and receive wireless signals for voice calls, video calls, Short Message Service (SMS) messages or Multimedia Messaging Service (MMS) messages, to/from a cellular phone, a smart phone, a tablet Personal Computer (PC) or other devices, a phone number of each of which is input or registered in the mobile terminal 100.

The mobile communication module 120 according to an embodiment of the present invention receives content data which is broadcasted from the broadcasting station or the broadcast service provider.

The storage 175, under control of the controller 110, stores the signals or data, which are input and output in response to operations of the mobile communication module 120, the sub-communication module 130, the multimedia module 140, the camera module 150, the GPS module 155, the I/O module 160, the sensor module 170, and the screen 190. The storage 175 stores applications and a control program for control of the mobile terminal 100 or the controller 110.

The term "storage" as used herein may be construed to include the storage 175, the ROM 112 and the RAM 113 in the controller 110, or a memory card (e.g., a Secure Digital (SD) card, a memory stick and the like) mounted in the mobile terminal 100. The storage 175 may include a non-volatile memory, a volatile memory, a Hard Disk Drive (HDD), or a Solid State Drive (SSD).

The storage 175 according to an embodiment of the present invention includes at least one of a word DB 177, the sign language DB 176 and the foreign language-based sign language DB 178.

Each word or sentence may be classified according to its difficulty (i.e., the degree of the difficulty) and stored in the word DB 177. For example, the words stored in the word DB 177 may be classified into compound words and derivative words having a high difficulty, and simplex words having a low difficulty.

A sign language indicating each word or sentence is stored in the sign language DB 176. For example, a sign language indicating a word such as "inflation" may be stored in the sign language DB 176. In accordance with an embodiment of the present invention, a first language-based sign language animation that is obtained by implementing a first language-based sign language in the form of an animation is stored in the sign language DB 176 to correspond to the corresponding word or sentence. In addition, in accordance with an embodiment of the present invention, sign language data corresponding to the words or sentence is stored in the sign language DB 176.

A second language-based sign language animation indicating each word or sentence made in a language (e.g., second language) other than the first language is stored in the foreign language-based sign language DB 178. For example, if the first language is assumed to be Korean, a second language-based sign language animation indicating an English word or an English sentence is stored in the foreign language-based sign language DB 178. In accordance with an embodiment of the present invention, a sign language animation for a second language word or sentence corresponding to the first language word or sentence is stored in the foreign language-based sign language DB 178. For example, a second language-based sign language animation indicating a second language word for "milk" corresponding to the first language "우유 (milk)" is stored in the foreign language-based sign language DB 178. In accordance with an embodiment of the present invention, sign language data corresponding to the second language words or sentence is stored in the foreign language-based sign language DB 178.

The screen 190 displays the data (e.g., content data) stored in the mobile terminal 100. In accordance with an embodiment of the present invention, the screen 190 may be implemented in the form of a touch screen and receives, from the user, a user input (e.g., a touch input) that occurs as the user touches the screen 190 with a part (e.g., fingers) of his or her body. The screen 190 may provide the user with user interfaces corresponding to various services (e.g., call, data transfer, broadcasting, photo shooting and the like). The screen 190 transmits an analog signal (or a touch input) corresponding to at least one touch that is input to the user interfaces, to the screen controller 195. The screen 190 receives at least one touch input through a user's body (e.g., fingers) or a touch input means (e.g., a stylus pen and the like). The screen 190 receives, as an input, the continuous movement of one of at least one touch. The screen 190 $y$ transmits an analog signal corresponding to the continuous movement of an input touch to the screen controller 195.

In an embodiment of the present invention, the touch is not limited to a contact touch (or direct touch) between the screen 190 and the user's body or the touch input means, but the screen 190 may include a noncontact touch (or indirect touch) with a detectable gap between the screen 190 and the user's body or the touch input means being set to, for example, 1 mm or less. The detectable gap between the screen 190 and the user's body or the touch input means may be subject to change depending on the performance or structure of the mobile terminal 100.

The screen 190 may be implemented in, for example, a resistive type, a capacitive type, an infrared type, or an acoustic wave type.

In an embodiment of the present invention, the screen 190 receives a user input for displaying a first language caption or a user input for a first language-based sign language. In accordance with an embodiment of the present invention, the screen 190 receives a user input for displaying a second language caption or a second language-based sign language.

The sub-communication module 130 includes at least one of a Wireless First Area Network (WLAN) module 131 and a short-range communication module 132, and the multimedia module 140 includes at least one of a broadcasting & communication module 141, an audio playback module 142 and a video playback module 143. The camera module 150 includes at least one of a first camera 151 and a second camera 152, and the I/O module 160 includes at least one of a button(s) 161, a microphone (MIC) 162, a speaker (SPK) 163, a vibration motor 164, a connector 165, a keypad 166 and an earphone jack 167. In the following description, the screen 190 and the screen controller 195 are assumed to be a touch screen and a touch screen controller, respectively.

The sub-communication module 130 includes at least one of the WLAN module 131 and the short-range communication module 132. For example, the sub-communication module 130 may include only one or both of the WLAN module 131 and the short-range communication module 132.

The WLAN module 131, under control of the controller 110, may be connected to the Internet in the place where a wireless Access Point (AP) (not shown) is installed. The WLAN module 131 may support the mobile terminal 100 for its wireless connection to the Internet. The WLAN module 131 may support the WLAN standard IEEE802.11x proposed by the Institute of Electrical and Electronics Engineers (IEEE) or other IEEE 802.11 standard.

The short-range communication module 132, under control of the controller 110, performs wireless short-range communication between the mobile terminal 100 and an image forming apparatus. The short-range communication scheme may include Bluetooth®, Infrared Data Association (IrDA), WiFi-Direct, Near Field Communication (NFC), and the like.

The mobile terminal 100 includes at least one of the mobile communication module 120, the WLAN module 131 and the short-range communication module 132 depending on its performance or structure. For example, the mobile terminal 100 may include a combination of the mobile communication module 120, the WLAN module 131 and the short-range communication module 132 depending on its performance or structure.

The multimedia module 140 includes the broadcasting & communication module 141, the audio playback module 142 or the video playback module 143. The broadcasting & communication module 141, under control of the controller 110, receives broadcast signals (e.g., TV broadcast signal, radio broadcast signal, data broadcast signal or the like) and additional broadcast information (e.g., Electric Program Guide (EPG), Electric Service Guide (ESG) or the like), which are transmitted from the broadcasting station via a broadcasting & communication antenna (not shown). In accordance with an embodiment of the present invention, the broadcasting & communication module 141 outputs the content data received via the mobile communication module 120, to the screen 190. The audio playback module 142, under control of the controller 110, plays digital audio files (with a file extension of, for example, mp3, wma, ogg or way), which are stored in the storage 175 or received from the external devices. The video playback module 143, under control of the controller 110, plays digital video files (with a file extension of, for example, mpeg, mpg, mp4, avi, mov, or mkv), which are stored in the storage 175 or received from the external devices. The video playback module 143 plays digital audio files as well.

In accordance with an embodiment of the present invention, the multimedia module 140 may include only the audio playback module 142 and the video playback module 143, excluding the broadcasting & communication module 141. The audio playback module 142 and the video playback module 143 in the multimedia module 140 may be incorporated into the controller 110.

The camera module 150 includes at least one of the first camera 151 and the second camera 152, each of which captures still images or videos under control of the controller 110. The first camera 151 or the second camera 152 may include a secondary light source (e.g., a flash) that provides the light needed for shooting. The first camera 151 may be mounted on the front of the mobile terminal 100, and the second camera 152 may be mounted on the rear of the mobile terminal 100. In accordance with another embodiment of the present invention, the first camera 151 and the second camera 152 may be mounted adjacent to each other (e.g., a gap between the first camera 151 and the second camera 152 may be set greater than 1 cm and less than 8 cm), making it possible to shoot three-dimensional (3D) still images or 3D videos.

The GPS module 155 receives radio waves from a plurality of GPS satellites in the Earth's orbit and calculates the location of the mobile terminal 100 using the Time of Arrival (ToA) from the GPS satellites to the mobile terminal 100.

The I/O module 160 includes at least one of the multiple buttons 161, the microphone 162, the speaker 163, the vibration motor 164, the connector 165, the keypad 166 and the earphone jack 167.

The buttons 161 may be formed on the front, side, or rear of the housing of the mobile terminal 100 and may include at least one of power/lock button, a volume button, a menu button, a home button, a back button, and a search button.

The I/O module 160 according to an embodiment of the present invention receives a user input for displaying a first language caption or a user input for displaying a first language-based sign language. In accordance with an embodiment of the present invention, the I/O module 160 receives a user input for displaying a second language caption or a second language-based sign language. In addition, the I/O module 160 receives a user input for outputting explanation data for explanation of technical terms, compound words, derivative words and the like included in the caption, to the screen 190.

The microphone 162, under control of the controller 110, generates an electrical signal by receiving a voce input or a sound input.

The speaker 163, under control of the controller 110, outputs the sounds corresponding to various signals (e.g., radio signals, broadcast signals, digital audio files, digital video files, photo shooting tones, or the like) from the mobile communication module 120, the sub-communication module 130, the multimedia module 140 or the camera module 150, to the outside of the mobile terminal 100. The speaker 163 outputs the sounds (e.g., button manipulation tones or ring back tones for calls) corresponding to the functions executed by the mobile terminal 100. One or multiple speakers 163 may be formed in a proper position (or positions) of the housing of the mobile terminal 100.

The vibration motor 164, under control of the controller 110, converts an electrical signal into mechanical vibrations. For example, if the mobile terminal 100 in a vibration mode receives a voice call from another device, the vibration motor 164 may be operated. One or multiple vibration motors 164 are formed in the housing of the mobile terminal 100. The vibration motor 164 operates in response to the user's touch operation of touching the screen 190 implemented as a touch screen, or the continuous movement of a touch on the screen 190.

The connector 165 is used as an interface for connecting the mobile terminal 100 to external devices or power sources. The mobile terminal 100, under control of the controller 110, transmits the data stored in the storage 175 thereof to the external devices or receives data from the external devices, via a wired cable connected to the connector 165. The mobile terminal 100 receives power from the power source or charges its rechargeable battery using the power source, via the wired cable connected to the connector 165.

The keypad 166 receives a key input from the user, for control of the mobile terminal 100. The keypad 166 may include a physical keypad formed on the mobile terminal 100 or a virtual keypad displayed on the screen 190. The physical keypad formed on the mobile terminal 100 may be excluded depending on the performance or structure of the mobile terminal 100.

An earphone may be inserted into the earphone jack 167 and connected to the mobile terminal 100.

The sensor module 170 includes at least one sensor for detecting a state of the mobile terminal 100. For example, the sensor module 170 may include a proximity sensor for detecting whether the user is in proximity to the mobile terminal 100, an illuminance sensor for detecting the amount of light around the mobile terminal 100, a motion sensor for detecting the movement (e.g., rotation, acceleration or vibration) of the mobile terminal 100, a geo-magnetic sensor for detecting the point of the compass using the Earth's magnetic field, a gravity sensor for detecting the direction of the gravity, an altimeter for detecting an altitude by measuring the atmospheric pressure, and the like. At least one sensor detects a state of the mobile terminal 100, generates a signal corresponding to the detection, and provides the signal to the controller 110. Sensors may be added or removed to/from the sensor module 170 depending on the performance or structure of the mobile terminal 100.

The sensor module 170 according to an embodiment of the present invention may include a proximity sensor. The proximity sensor is a sensor for detecting the user's movement (e.g., the movement of the user's finger), the user being in proximity to the screen 190 within a specific range. For example, if the screen 190 is implemented in the capacitive type, the sensor module 170 implemented with a proximity sensor detects the user's movement by detecting a change in capacitance, which occurs within a specific range (e.g., the height of 10 cm from the screen 190) of the screen 190. The detected user's movement may also belong to the user input.

The power supply 180, under control of the controller 110, supplies power to one or multiple rechargeable batteries mounted on the housing of the mobile terminal 100. The one or multiple rechargeable batteries supply power to the mobile terminal 100. The power supply 180 supplies, to the mobile terminal 100, the power that is received from the external power source via a wired cable connected to the connector 165. The power supply 180 may supply, to the mobile terminal 100, the power that is wirelessly received from the external power source through wireless charging technology.

The screen controller 195 converts an analog signal received from the screen 190 into a digital signal (e.g., X and Y coordinates) and provides the digital signal to the controller 110. The controller 110 controls the screen 190 using the digital signal received from the screen controller 195. For example, the controller 110 may allow a shortcut icon displayed on the screen 190 to be selected or executed in response to a touch. The screen controller 195 may be implemented to be incorporated into the controller 110.

In accordance with an embodiment of the present invention, the screen controller 195 extracts coordinates on the screen 190, which correspond to a proximity sensing input that is detected by the sensor module 170. For example, it will be assumed that a proximity sensing input for selecting one point (e.g., a first point) within a specific range on the screen 190 has been detected by the sensor module 170. It will also be assumed that the proximity sensing has been implemented in a capacitive way. The sensor module 170 detects a change in capacitance, which occurs within a specific range of the screen 190, and the controller 110 controls the screen controller 195 to output coordinates of a point (e.g., a second point) on the screen 190, which correspond to the point (e.g., the first point) where the capacitance has changed. For example, the second point may be one point on the screen 190, which is located closest to the first point.

In accordance with an embodiment of the present invention, the mobile terminal 100 may be connected to the external devices using connection units such as the sub-communication module 130, the connector 165, the earphone jack 167 and the like.

The external devices may include a variety of devices such as an earphone, an external speaker, a Universal Serial Bus (USB) memory, a charger, a cradle/dock, a DMB antenna, a mobile payment device, a healthcare device (e.g., a blood glucose meter and the like), a game console, a car navigation device, and the like, each of which can be detachably connected to the mobile terminal 100 by wires. The external devices may also include short-range communication devices such as a Bluetooth® device, an NFC device, a WiFi Direct device, a wireless AP and the like, each of which can be wirelessly connected to the mobile terminal 100 by short-range communication. The external devices may also include other devices, cellular phones, smart phones, tablet PCs, desktop PCs, servers and the like.

Figure 2:
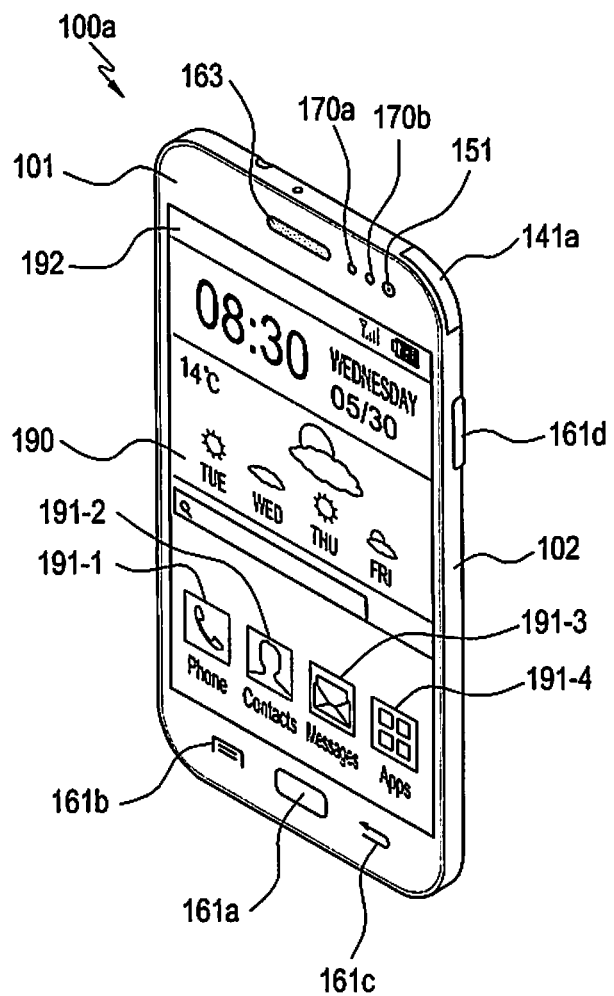
FIG. 2 is a front perspective view of a mobile terminal, according to an embodiment of the present invention.
Figure 3:
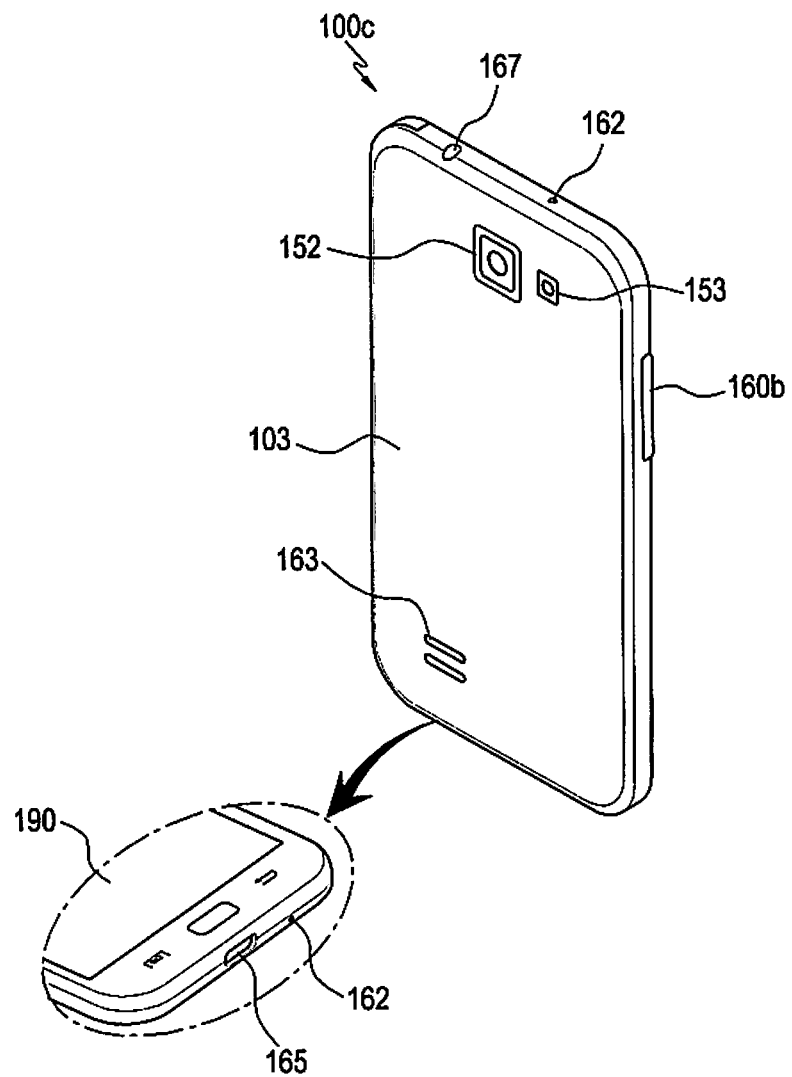
FIG. 3 is a rear perspective view of a mobile terminal, according to an embodiment of the present invention.

FIG. 2 is a front perspective view of a mobile terminal, according to an embodiment of the present invention, and FIG. 3 is a rear perspective view of a mobile terminal, according to an embodiment of the present invention.

Referring to FIG. 2, the screen 190 may be disposed in the center of a front 100a of the mobile terminal 100. The screen 190 is formed large enough to occupy most of the front 100a of the mobile terminal 100.

In the example of FIG. 2, a main home screen is displayed on the screen 190. The main home screen may be the first screen that is displayed on the screen 190 when the mobile terminal 100 is powered on. If the mobile terminal 100 has different home screens of several pages, the main home screen may be the first home screen among the home screens of several pages. On the main home screen may be displayed shortcut icons 191-1, 191-2 and 191-3 for executing the frequently used applications, a Switch-to-Main Menu key (or Apps key) 191-4, the time, the weather and the like. The Switch-to-Main Menu key 191-4 is used to display a menu screen on the screen 190. At the top of the screen 190 may be formed or displayed a status bar 192 that displays a state of the mobile terminal 100, such as the battery charging status, the received signal strength, the current time and the like.

Under the screen 190 may be formed a home button 161a, a menu button 161b, and a back button 161c. The home button 161a is used to display the main home screen on the screen 190. For example, if the home button 161a is touched while any home screen different from the main home screen, or a menu screen is displayed on the screen 190, the main home screen is displayed on the screen 190. If the home button 191a is touched while applications are executed on the screen 190, the main home screen illustrated in FIG. 2 is displayed on the screen 190. In addition, the home button 161a is used to display the recently used applications on the screen 190, or to display a task manager.

The menu button 161b is used to provide connection menus that can be used on the screen 190. The connection menus may include an Add Widget menu, a Change Wallpaper menu, a Search menu, an Edit menu, a Preferences menu, and the like.

The back button 161c is used to display the previously executed screen, or to exit the most recently used application.

On the edge of the front 100a of the mobile terminal 100 may be disposed the first camera 151, an illuminance sensor 170a, and a proximity sensor 170b.

Referring to FIG. 3, on a rear 100c of the mobile terminal 100 may be disposed the second camera 152, a flash 153 and the speaker 163.

On a side 100b of the mobile terminal 100 may be disposed, for example, a power/reset button 161d, a volume button 160b, a DMB antenna 141a for reception of broadcast, one or multiple microphones 162, and the like. The DMB antenna 141a may be detachably fixed to the mobile terminal 100.

The connector 165 may be formed in the bottom of the mobile terminal 100. A plurality of electrodes may be formed in the connector 165 and connected to the external devices by wires. The earphone jack 167 is formed on the top of the mobile terminal 100 such that an earphone may be inserted into the earphone jack 167.

Figure 4:
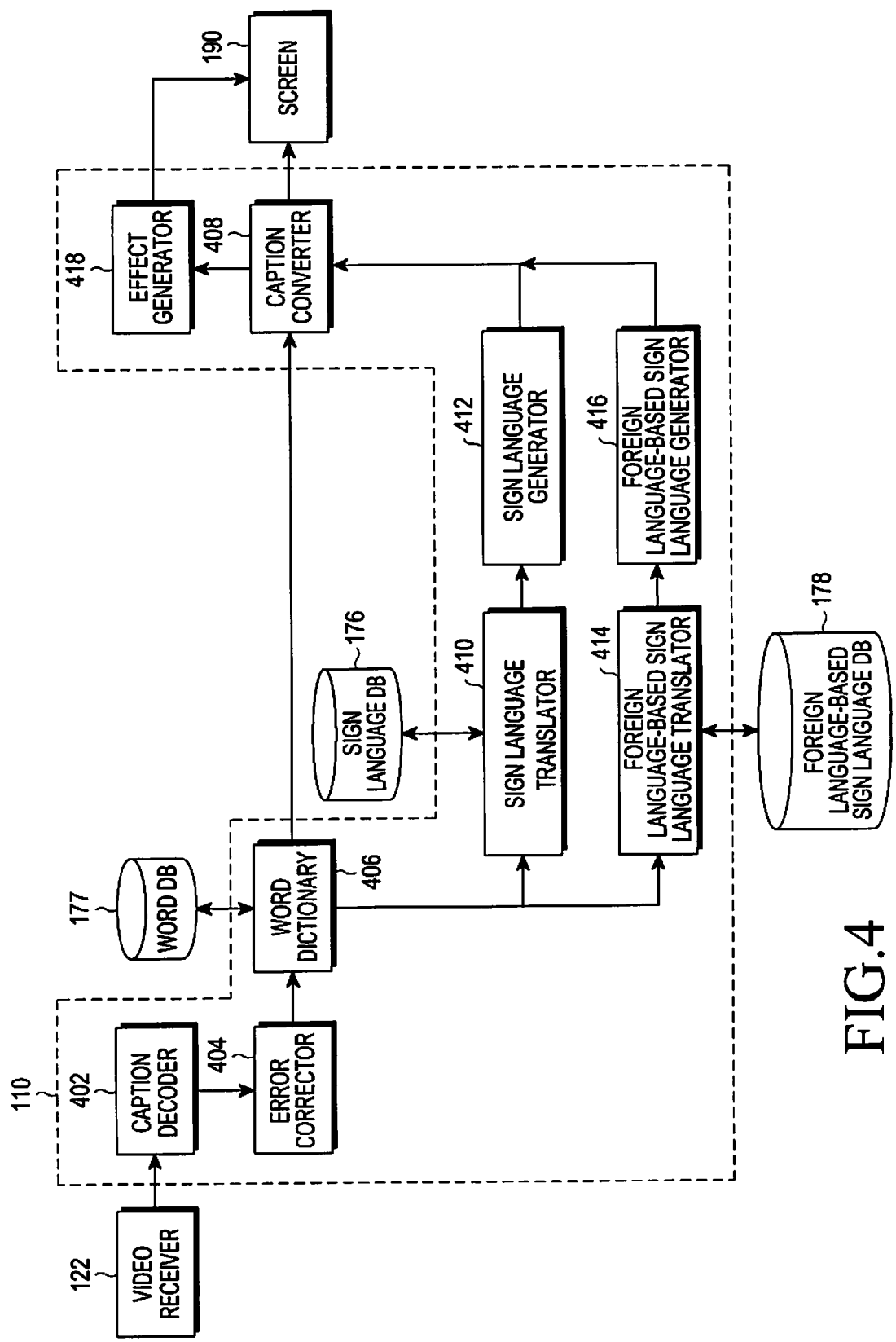
FIG. 4 is a block diagram illustrating a configuration of the controller illustrated in FIG. 1, according to an embodiment of the present invention.

FIG. 4 is a diagram illustrating a configuration of the controller illustrated in FIG. 1.

The controller 110 of the mobile terminal 100 according to an embodiment of the present invention receives content data through a video receiver 122 included in the mobile communication module 120. In an embodiment of the present invention, it will be assumed that the content data includes only the video data or includes both of the video data and the first caption data. The controller 110 determines whether the first caption data is included in the content data. If the first caption data is not included in the content data (e.g., if the content data includes only the video data), the controller 110 controls the screen 190 to display the video data. On the other hand, if the first caption data is included in the content data (e.g., if the content data includes both of the video data and the first caption data), the controller 110 controls the screen 190 to simultaneously display the video data and the first caption data.

Referring to FIG. 4, the controller 110 includes at least one of a caption decoder 402, an error corrector 404, a word dictionary 406, a caption converter 408, a sign language translator 410, a sign language generator 412, a foreign language-based sign language translator 414, a foreign language-based sign language generator 416, and an effect generator 418. For convenience of description, FIG. 4 also illustrates the video receiver 122 included in the mobile communication module 120; the word DB 177, the sign language DB 176 and the foreign language-based sign language DB 178 included in the storage 175 (not shown in FIG. 4); and the screen 190.

The video receiver 122 receives content data (e.g., broadcast signals (e.g., TV broadcast signal, data broadcast signal and the like) which are transmitted from the broadcasting station) via a broadcasting & communication antenna. Upon receiving the content data, the video receiver 122 delivers the received content data to the caption decoder 402 in the controller 110. Before the content data is delivered to the caption decoder 402, the controller 110 determines whether the first caption data is included in the content data. In accordance with an embodiment of the present invention, the controller 110 delivers the content data to the caption decoder 402 only if the first caption data is included in the content data. If the first caption data is not included in the content data, the controller 110 directly delivers the content data to the screen 190.

The caption decoder 402 extracts the first caption data from the content data. In an embodiment of the present invention, the first caption data may include a first language caption. The first language caption may be, for example, a caption that is created in a language of the country including the area where the broadcast signal is transmitted.

The error corrector 404 performs error checking on the first caption data extracted by the caption decoder 402. Through the error checking, the error corrector 404 corrects an error (e.g., a typographical error, a syntax error or the like) of a first language caption included in the first caption data. In accordance with an embodiment of the present invention, the error corrector 404 corrects an error of the first caption data, referring to the word DB 177.

In accordance with an embodiment of the present invention, a more accurate caption is provided to the user by correcting the first caption data included in the content data. More specifically, if the first caption data is corrected as above, the sign language translator 410 translates the first language caption included in the first caption data into a more accurate sign language. For Example, the sign language translator 410 may translate a native language caption into a native language-based sign language. Even if the foreign language-based sign language translator 414 translates the first language caption included in the first caption data into a second language caption, the foreign language-based sign language translator 414 increases the accuracy of its translation into the second language.

If the error is corrected by the error corrector 404, the word dictionary 406 determines the degree of the difficulty of words or sentences included in the first caption data (e.g., the first language caption). The word dictionary 406 may determine the difficulty of words, referring to the word DB 177.

In accordance with an embodiment of the present invention, the word dictionary 406 extracts, from the first caption data, a word whose difficulty is higher than or equal to a reference difficulty that is stored in advance in the storage 175. In the following description, a word whose difficulty is higher than or equal to a reference difficulty will be referred to as a "high-difficulty word" for convenience of description. The reference difficulty is stored in advance in the storage 175 and is specified by a user input that is made through the I/O module 160 or the screen 190. The word dictionary 406 generates explanation data corresponding to each of the high-difficulty words, referring to the word DB 177.

The caption converter 408 converts the first caption data into second caption data by adding the explanation data generated by the word direction 406 to the first caption data. In accordance with an embodiment of the present invention, the caption converter 408 generates explanation data corresponding to each of the high-difficulty words, referring to the word DB 177. The explanation data includes texts, images and the like for explanation of the high-difficulty word and may be displayed on the screen 190 in the form of, for example, a pop-up window according to an embodiment of the present invention.

In accordance with an embodiment of the present invention, the caption converter 408 converts the first caption data into second caption data by adding a first language-based sign language animation generated by the sign language generator 412 to the first caption data. In addition, the caption converter 408 converts the first caption data into second caption data by adding a foreign language-based sign language animation generated by the foreign language-based sign language generator 416 to the first caption data.

In accordance with an embodiment of the present invention, the caption converter 408 determines a font type, a font size, a font color and the like of the first language caption or the second language caption and determines the position and size of the area where the first language caption or the second language caption is displayed on the screen 190. The caption converter 408 determines a font type, a font size, a font color and the like of the explanation data and determines the position and size of the area where the explanation data is displayed on the screen 190. In addition, the caption converter 408 determines the size in which a first language-based sign language animation or a second language-based sign language animation is displayed, and determines the position where a first language-based sign language animation or a second language-based sign language animation is displayed on the screen 190.

The sign language translator 410 translates at least a portion of the first caption data (e.g., the first language (the native language) caption) into a sign language, referring to the sign language DB 176. In accordance with an embodiment of the present invention, the sign language translator 410 translates a high-difficulty word or a sentence including the high-difficulty word into a sign language. For example, the sign language translator 410 translates a high-difficulty word of "inflation" into a sign language. In addition, the sign language translator 410 translates a high-difficulty phrase of "inflation has occurred" into a sign language.

If at least a portion of the first language caption is translated into a sign language by the sign language translator 410, the sign language generator 412 generates a first language-based sign language animation based on the translation results. In accordance with an embodiment of the present invention, the sign language generator 412 generates a first language-based sign language animation that is created by implementing a sign language indicating a word or a sentence in the form of an animation. The sign language generator 412 generates a first language-based sign language animation based on the sign language data corresponding to the word or sentence. Thereafter, the sign language generator 412 delivers the first language-based sign language animation to the caption converter 408.

The foreign language-based sign language translator 414 translates the first caption data (e.g., at least a portion of the first language (native language) caption) into a second language-based sign language (e.g., foreign language-based sign language), referring to the foreign language-based sign language DB 178. In accordance with an embodiment of the present invention, the foreign language-based sign language translator 414 generates a second language caption obtained by translating the first language caption into a second language. If the second language caption is generated, the foreign language-based sign language translator 414 translates at least a portion of the second language caption into a second language-based sign language. For example, the foreign language-based sign language translator 414 may translate a Korean caption of "달력 (calendar)" into an English sign language sign corresponding to "calendar."

If at least a portion of the second language caption is translated into a second language-based sign language by the foreign language-based sign language translator 414, the foreign language-based sign language generator 416 generates a second language-based sign language animation based on the translation results. The foreign language-based sign language generator 416 generates a second language-based sign language animation based on the sign language data corresponding to the word or sentence. Thereafter, the foreign language-based sign language generator 416 delivers the second language-based sign language animation to the caption converter 408.

The caption converter 408 generates second caption data by adding, to the first caption data, at least one of the explanation data generated by the word direction 406, the first language-based sign language animation generated by the sign language generator 412, and the second language-based sign language animation generated by the foreign language-based sign language generator 416. As described above, in an embodiment of the present invention, the second caption data includes the first caption data (e.g., the first language caption) and at least one of the explanation data, the first language-based sign language animation and the second language-based sign language animation. In accordance with an embodiment of the present invention, the second caption data further includes attribute data generated by the effect generator 418.

The effect generator 418 generates attribute data for generating an event (e.g., special effects) corresponding to at least a portion of the first caption data or the second caption data when displaying the first caption data or the second caption data on the screen 190. The attribute data generated by the effect generator 418 is a control signal for allowing the mobile terminal 100 to generate special effects such as heats, lights, vibrations and the like, depending on the word included in the first caption data or the second caption data.

For example, it will be assumed that a word "earthquake" is included in the first caption data. In response to the word "earthquake," the effect generator 418 generates, as attribute data, a control signal for allowing the mobile terminal 100 to make vibrations. If the user selects the word "earthquake" in the caption displayed on the screen 190 after the attribute data is generated, the vibration motor 164 of the mobile terminal 100 generates vibrations.

Figure 5:
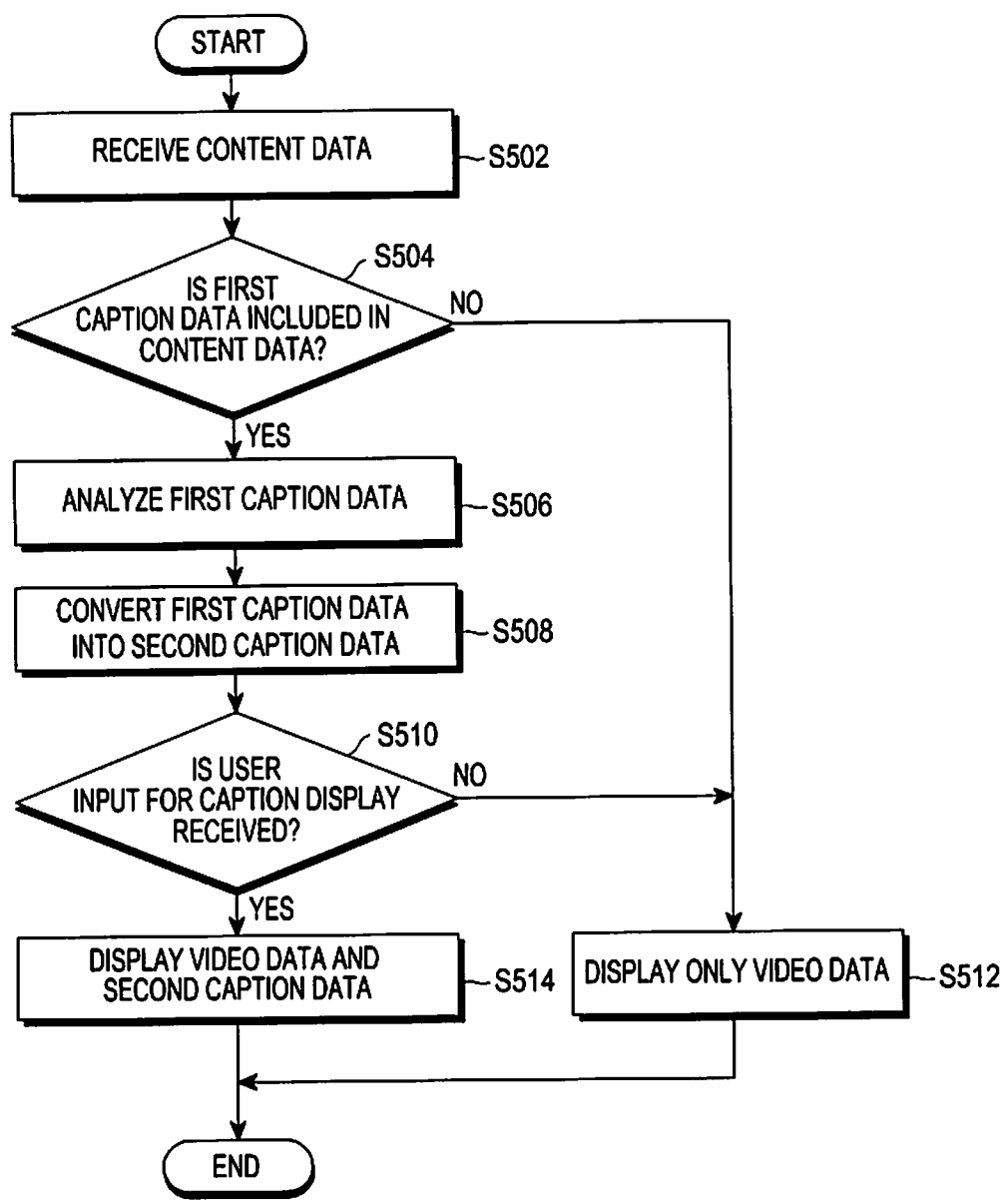
FIG. 5 is a flowchart illustrating an example of a caption display method in the mobile terminal illustrated in FIG. 1, according to an embodiment of the present invention.

FIG. 5 is a flowchart illustrating an example of a caption display method in the mobile terminal illustrated in FIG. 1, according to an embodiment of the present invention.

Referring to FIG. 5, at step S502, the video receiver 122 of the mobile terminal 100 receives content data. It will be assumed that the content data that the video receiver 122 has received at step S502 is a broadcast signal broadcasted from the broadcasting station. The content data may include video data, and may further include first caption data.

The controller 110 determines at step S504 whether the first caption data is included in the content data received at step S502. In an embodiment of the present invention, the first caption data is assumed to include a first language caption.

If it is determined at step S504 that the first caption data is not included in the content data (No at step S504), the controller 110 controls the screen 190 to display only the video data on the screen 190 at step S512.

However, if it is determined at step S504 that the first caption data is included in the content data (Yes at step S504), the controller 110 analyzes the first caption data at step S506. At step S508, the controller 110 converts the first caption data into second caption data.

The controller 110 determines at step S510 whether a user input for caption display is received. It will be assumed in an embodiment of the present invention that the first caption data or the second caption data is displayed on the screen 190 that should receive a user input for display thereof. In accordance with another embodiment of the present invention, the first caption data or the second caption data is displayed on the screen 190 even if the user input for caption display is not received.

If it is determined at step S510 that the user input for caption display is received (Yes at step S510), the controller 110 controls the screen 190 to display both of the video data and the second caption data at step S514.

On the other hand, if it is determined at step S510 that the user input for caption display is not received (No at step S510), the controller 110 controls the screen 190 to display only the video data on the screen 190 at step S512.

Figure 6:
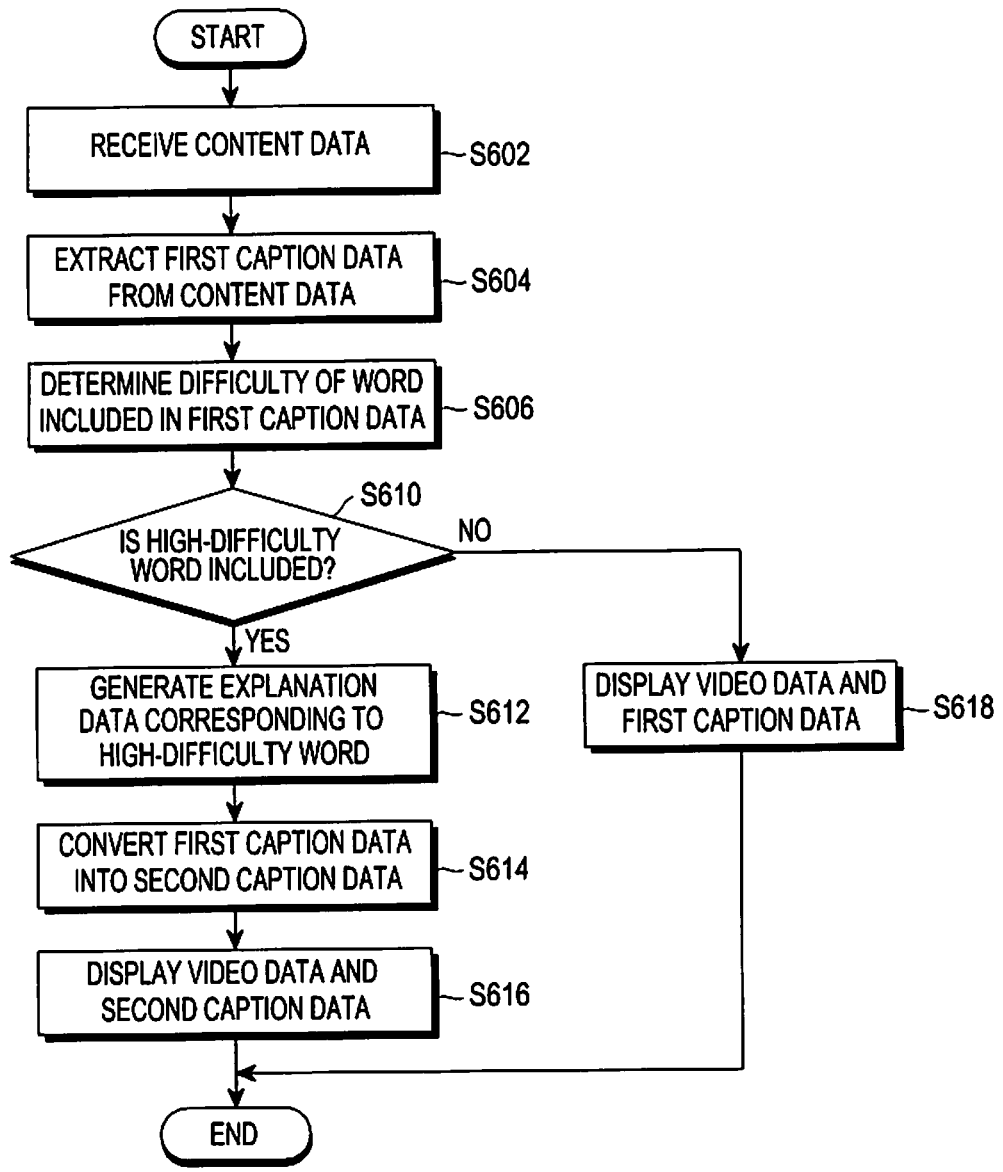
FIG. 6 is a flowchart illustrating another example of a caption display method in the mobile terminal illustrated in FIG. 1, according to an embodiment of the present invention.

FIG. 6 is a flowchart illustrating another example of a caption display method in the mobile terminal illustrated in FIG. 1, according to an embodiment of the present invention.

Referring to FIG. 6, at step S602, the video receiver 122 of the mobile terminal 100 receives content data. It will be assumed that the content data that the video receiver 122 has received at step S602 is a broadcast signal broadcasted from the broadcasting station. It will be assumed that the content data includes video data and first caption data.

At step S604, the caption decoder 402 in the controller 110 extracts the first caption data from the content data received at step S602. It will be assumed in an embodiment of the present invention that the first caption data includes a first language caption. If the first caption data is extracted, the error corrector 404 corrects an error of the first language caption included in the first caption data.

At step S606, the word dictionary 406 in the controller 110 determines the difficulty (or the degree of the difficulty) for each of the words included in the first caption data (e.g., included in the first language caption in the first caption data). Each of the words may be divided depending on the degree of its difficulty, which is stored in advance in the storage 175, especially in the word DB 177. In accordance with an embodiment of the present invention, the degree of the difficulty is determined in advance by the user input. Preferably, the difficulty of each of the words may be high, for compound words, derivative words or technical terms.

If the difficulty for each of the words is determined, the word dictionary 406 determines at step S610 whether a high-difficulty word is included in the first caption data (e.g., in the first language caption). If the high-difficulty word is included in the first language caption, the user of the mobile terminal 100 may have difficulty in understanding the contents of the first language caption. Therefore, in an embodiment of the present invention, if the high-difficulty word is included in the first language caption, an explanation of the high-difficulty word is added to the first language caption, thereby allowing the user to easily understand the first language caption.

If it is determined at step S610 that the high-difficulty word is included in the first caption data (Yes at step S610), the caption converter 408 in the controller 110 generates explanation data corresponding to the high-difficulty word at step S612. At step S614, the caption converter 408 converts the first caption data into second caption data by adding the explanation data to the first caption data. At step S616, the controller 110 controls the screen 190 so that both of the video data and the second caption data may be displayed on the screen 190.

On the other hand, if it is determined at step S610 that the high-difficulty word is not included in the first caption data (No at step S610), the controller 110 controls the screen 190 so that both of the video data and the first caption data is displayed on the screen 190 in operation S618.

Figure 7:
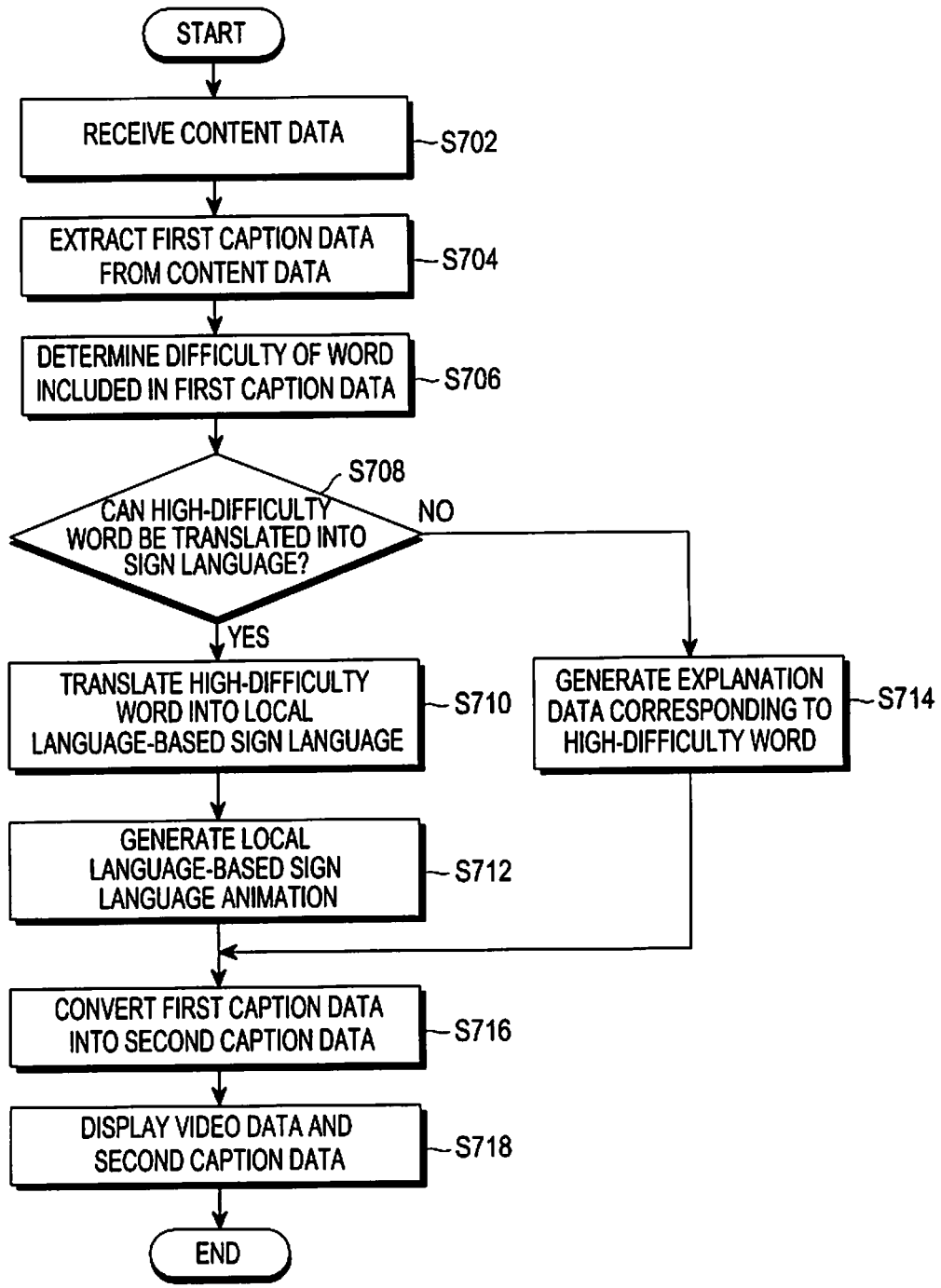
FIG. 7 is a flowchart illustrating still another example of a caption display method in the mobile terminal illustrated in FIG. 1, according to an embodiment of the present invention.

FIG. 7 is a flowchart illustrating another example of a caption display method in the mobile terminal illustrated in FIG. 1, according to an embodiment of the present invention.

Referring to FIG. 7, at step S702, the video receiver 122 of the mobile terminal 100 receives content data. It will be assumed that the content data that the video receiver 122 has received at step S702 is a broadcast signal broadcasted from the broadcasting station. It will be assumed that the content data includes video data and first caption data.

At step S704, the caption decoder 402 in the controller 110 extracts the first caption data from the content data received at step S702. It will be assumed in an embodiment of the present invention that the first caption data includes a first language caption. If the first caption data is extracted, the error corrector 404 corrects an error of the first language caption included in the first caption data.

At step S706, the word dictionary 406 in the controller 110 may determine the difficulty for each of the words included in the first caption data (e.g., included in the first language caption in the first caption data). Each of the words may be divided depending on the degree of its difficulty, which is stored in advance in the storage 175, especially in the word DB 177. In accordance with an embodiment of the present invention, the degree of the difficulty is determined in advance by the user input. Preferably, the difficulty of each of the words may be high, for compound words, derivative words or technical terms.

It will be assumed in an embodiment of the present invention that a high-difficulty word is included in the first caption data. The sign language translator 410 in the controller 110 determines at step S708 whether the sign language translator 410 can translate the high-difficulty word into a sign language.

As mentioned above, if a high-difficulty word is included in the first language caption, the user of the mobile terminal 100 may have difficulty in understanding the contents of the first language caption. Therefore, in an embodiment of the present invention, an explanation of the high-difficulty word included in the first language caption is added as explanation data, or a sign language corresponding to the high-difficulty word may be implemented in the form of animation, and then displayed for the user, thereby allowing the user to easily understand the first language caption.

If it is determined at step S708 that the sign language translator 410 can translate the high-difficulty word into a sign language, the caption converter 408 in the controller 110 translates the high-difficulty word into a first language-based sign language at step S710. At step S712, the caption converter 408 generates a first language-based sign language animation based on the first language-based sign language corresponding to the high-difficulty word. At step S716, the caption converter 408 converts the first caption data into second caption data by adding the first language-based sign language animation to the first caption data. At step S718, the controller 110 controls the screen 190 to simultaneously display the video data and the second caption data on the screen 190. As stated above, the second caption data includes the first language caption (which is the first caption data), and the first language-based sign language animation.

On the other hand, if it is determined at step S708 that the sign language translator 410 cannot translate the high-difficulty word into a sign language, the caption converter 408 in the controller 110 generates explanation data corresponding to the high-difficulty word at step S714. At step S716, the caption converter 408 converts the first caption data into second caption data by adding the explanation data to the first caption data. At step S718, the controller 110 controls the screen 190 to display the video data and the second caption data. As stated above, the second caption data includes the first language caption (which is the first caption data) and the explanation data.

Although it is assumed at step S718, in an embodiment of the present invention, that the screen 190 simultaneously displays the video data and the second caption data, the controller 110 may display only the video data and the caption data in another embodiment of the present invention. Upon receiving a user input for displaying explanation data or a first language-based sign language animation while displaying only the first caption data, the controller 110 controls the screen 190 to display the explanation data or the first language-based sign language animation.

Figure 8:
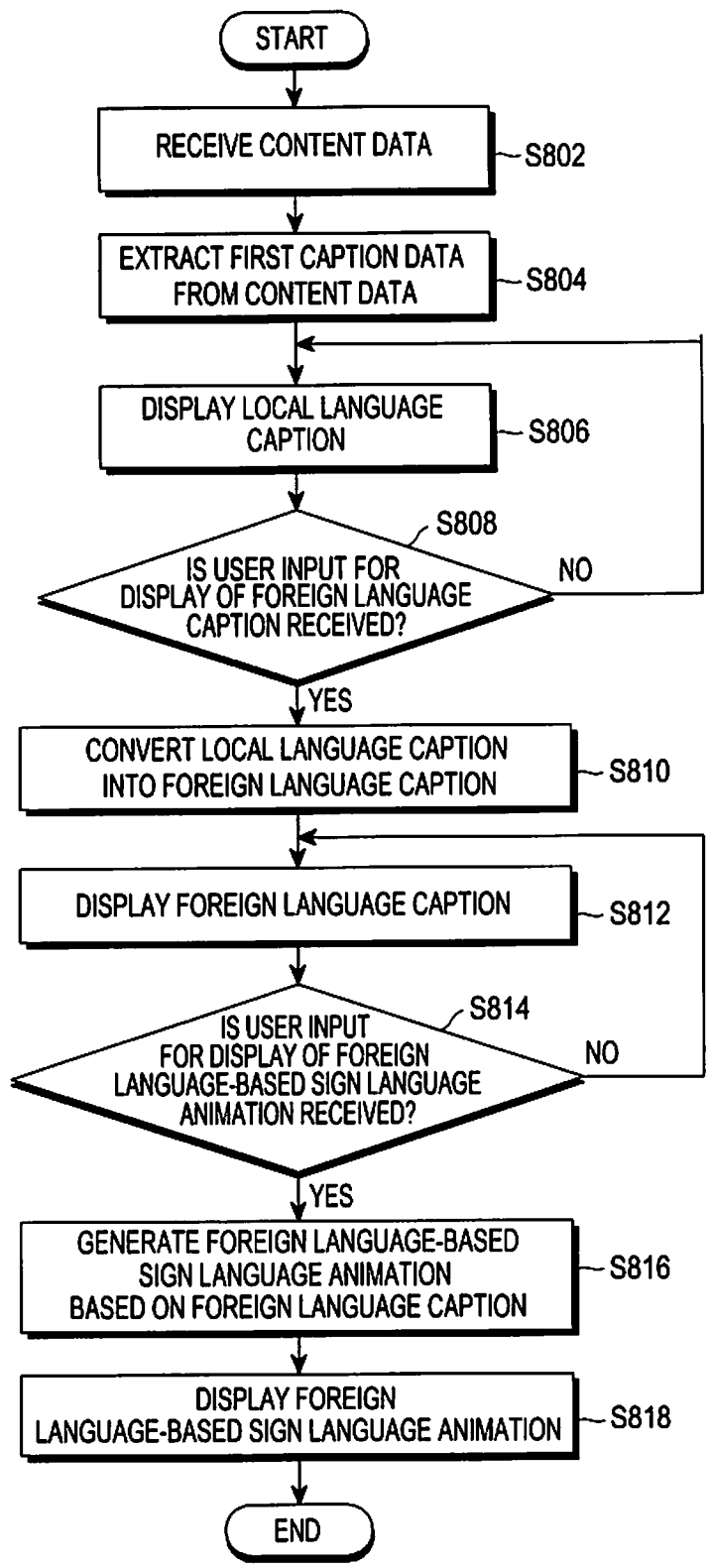
FIG. 8 is a flowchart illustrating yet another example of a caption display method in the mobile terminal illustrated in FIG. 1, according to an embodiment of the present invention.

FIG. 8 is a flowchart illustrating yet another example of a caption display method in the mobile terminal illustrated in FIG. 1, according to an embodiment of the present invention.

Referring to FIG. 8, at step S802, the video receiver 122 of the mobile terminal 100 receives content data. It will be assumed that the content data that the video receiver 122 has received at step S802 is a broadcast signal broadcasted from the broadcasting station. It will be assumed that the content data includes video data and first caption data.

At step S804, the caption decoder 402 in the controller 110 extracts the first caption data from the content data received at step S802. It will be assumed in an embodiment of the present invention that the first caption data includes a first language caption. If the first caption data is extracted, the error corrector 404 corrects an error of the first language caption included in the first caption data.

At step S806, the controller 110 controls the screen 190 to display the first language caption. In accordance with an embodiment of the present invention, prior to step S806, the word dictionary 406 in the controller 110 determines the difficulty for each of the words included in the first caption data (e.g., included in the first language caption in the first caption data). In addition, the word dictionary 406 in the controller 110 determines whether a sign language animation corresponding to each of the high-difficulty words is present in the storage 175, especially in the sign language DB 176. If a high-difficulty word is included in the first language caption, the caption converter 408 in the controller 110 converts the first language caption into a first language-based sip language animation. The controller 110 controls the screen 190 to display the first language-based sign language animation instead of the first language caption.

While the first language caption is displayed on the screen 190, the controller 110 determines at step S808 whether a user input for displaying a second language caption is received. In an embodiment of the present invention, the I/O module 160 or the screen 190 receives the user input for displaying a second language caption.

If it is determined at step S808 that the user input for displaying a second language caption is not received, the controller 110 keeps the current state where it displays the first language caption at step S806.

In accordance with another embodiment of the present invention, after step S806, the I/O module 160 or the screen 190 receives the user input for displaying a first language-based sign language animation. In this case, the sign language translator 410 in the controller 110 generates a first language-based sign language animation based on the first language caption. The sign language translator 410 generates a first language-based sign language animation having the same meaning as that of at least a portion of the first language caption based on the sign language DB 176. The screen 190 displays the first language-based sign language animation instead of the first language caption.

If it is determined at step S808 that the user input for displaying a second language caption is received, the word dictionary 406 in the controller 110 converts the first language caption into a second language caption at step S810. At step S812, the controller 110 controls the screen 190 to display the second language caption.

While the second language caption is displayed on the screen 190, the controller 110 determines at step S814 whether a user input for displaying a second language-based sign language animation is received. Like in the case of the second language caption, the I/O module 160 or the screen 190 according to an embodiment of the present invention receives a user input for displaying a second language-based sign language animation.

If it is determined at step S814 that the user input for displaying a second language-based sign language animation is not received (No at step S814), the controller 110 keeps the current state where it displays the second language caption at step S812.

On the other hand, if it is determined at step S814 that the user input for displaying a second language-based sign language animation is received (Yes at step S814), the foreign language-based sign language translator 414 in the controller 110 generates a second language-based sign language animation based on the second language caption at step S816. At step S816, the foreign language-based sign language translator 414 generates a second language-based sign language animation having the same meaning as that of at least a portion of the second language caption. Thereafter, at step S818, the controller 110 controls the screen 190 to display the second language-based sign language animation.

Figure 9A:
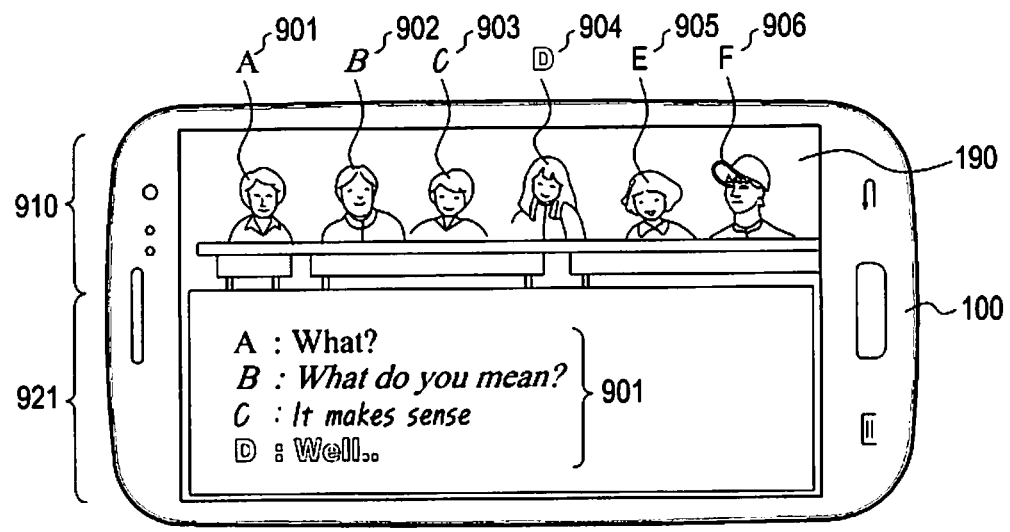
FIGS. 9A and 9B are diagrams illustrating examples of displaying a caption in the mobile terminal illustrated in FIG. 1, according to an embodiment of the present invention.
Figure 9B:
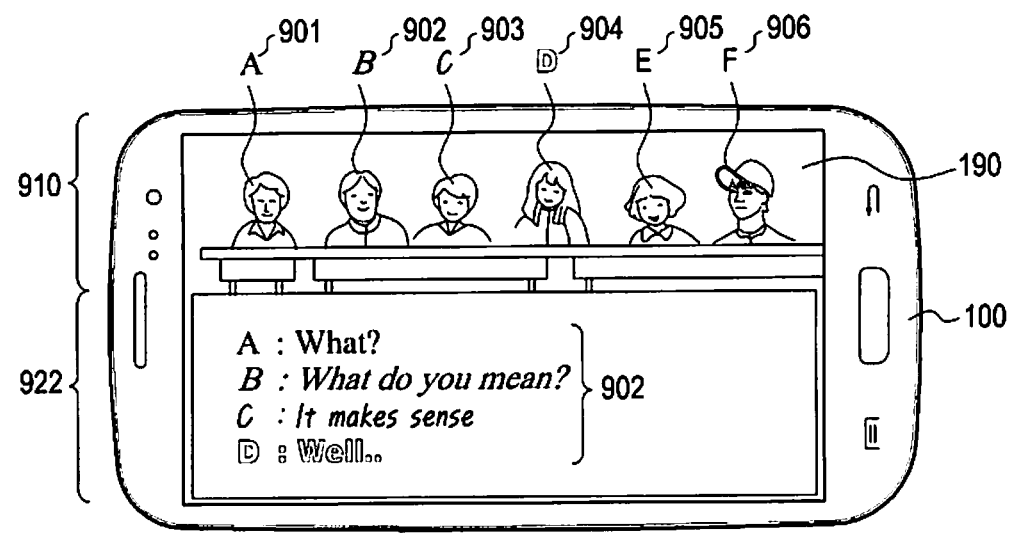

FIGS. 9A and 9B are diagrams illustrating an example of displaying a caption in the mobile terminal illustrated in FIG. 1, according to an embodiment of the present invention.

Referring to FIGS. 9A and 9B, the screen 190 of the mobile terminal 100 may display video data 910 and second caption data 921 and 922 as content data. The second caption data 921 and 922 in FIGS. 9A and 9B both include a first language caption, so the screen 190 in the FIGS. 9A and 9B displays the first language caption as the second caption data 921 and 922. It will be assumed that the content data in FIGS. 9A and 9B includes video data 910 and first caption data that is created such that the words of persons A 901, B 902, C 903, D 904, E 905 and F 906 in the video data 910 are displayed in different types.

Referring to FIGS. 9A and 9B, the video data 910 corresponds to the video in which the persons A 901, B 902, C 903, D 904, E 905 and F 906 are talking to each other, and the second caption data 921 and 922 correspond to the texts that are included in the dialog made between the persons A 901, B 902, C 903, D 904, E 905 and F 906. The dialog between the persons A 901, B 902, C 903, D 904, E 905 and F 906 is displayed as the second caption data 921 and 922 in a lower portion of the video data 910.

Like the second caption data 921 and 922 illustrated in FIGS. 9A and 9B, the caption converter 408 in the controller 110 generates second caption data in different types in order to distinguish the words of the persons A 901, B 902, C 903, D 904, E 905 and F 906. Accordingly, in FIGS. 9A and 9B, the words of the persons A 901, B 902, C 903 and D 904 are represented in different types by displaying the words of the persons A 901, B 902, C 903 and D 904 differently depending on the speakers. Although only the words of the persons A 901, B 902, C 903 and D 904 are displayed as the second caption data 921 and 922 in FIGS. 9A and 9B, the words of the persons E 905 and F 906 may also be displayed on the screen 190 as a caption having different types from those of the words of the persons A 901, B 902, C 903 and D 904. Although characters corresponding to their associated speakers are represented in different types in FIGS. 9A and 9B, the caption converter 408 displays the words of the speakers in different colors according to an embodiment of the present invention. For example, the caption converter 408 displays the word of the person A 901 as a blue caption, the word of the person B 902 as a green caption, and the word of the person C 903 as a black caption.

As for the second caption data 921 and 922 in FIGS. 9A and 9B, the caption converter 408 generates the second caption data 921 and 922 that is created to display different types of captions depending on the speakers even in the same first language caption. In addition, the first language caption of the second caption data 921 in FIG. 9A may be different in font type from the first language caption of the second caption data 922 in FIG. 9B. As described above, the caption converter 408 may change the font type of the first language caption or second language caption included in the second caption data 921 and 922 arbitrarily or depending on the user input. In accordance with an embodiment of the present invention, the font type, the font size or the like may vary depending on the speakers even in the same first language caption.

In accordance with an embodiment of the present invention, the caption converter 408 updates the second caption data 921 and 922 in real time depending on the user input through the I/O module 160 or the screen 190. For example, while the second caption data 921 and 922 is displayed on the screen 190, the mobile terminal 100 may receive, from the user, a user input for changing at least one of the font type, font color and font size of the caption. Upon receiving the user input, the caption converter 408 changes the second caption data 921 and 922 depending on the user input, and the screen 190 displays the changed second caption data 921 and 922.

Figure 10:
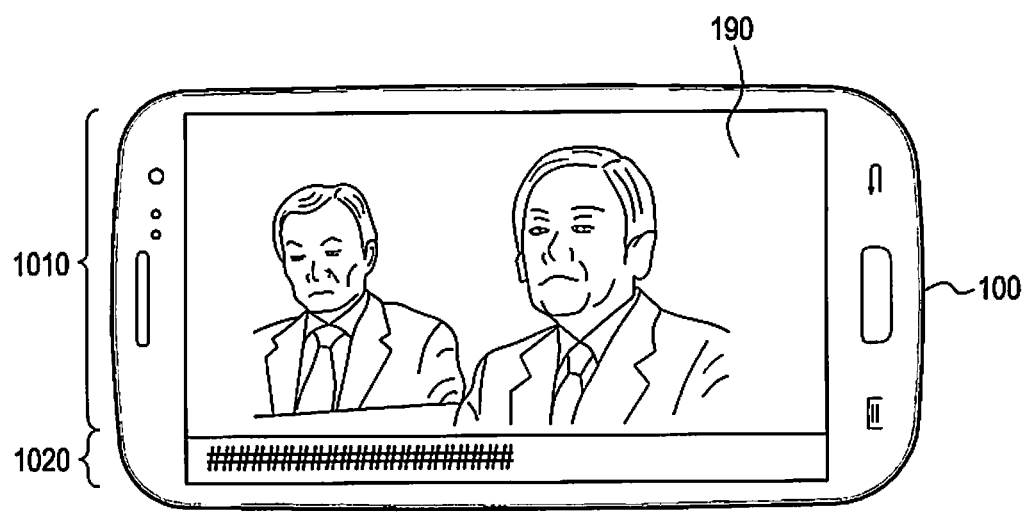
FIG. 10 is a diagram illustrating another example of displaying a caption in the mobile terminal illustrated in FIG. 1, according to an embodiment of the present invention.

FIG. 10 is a diagram illustrating another example of displaying a caption in the mobile terminal illustrated in FIG. 1, according to an embodiment of the present invention. It will be assumed that content data in FIG. 10 includes video data 1010 and second caption data 1020 that is converted from first caption data.

In an embodiment of the present invention, the mobile terminal 100 may limit the viewing of content data depending on the age of the user. The video data 1010 in the content data illustrated in FIG. 10 may correspond to a movie. In addition, some of the first caption data may include the words (e.g., slangs, jargons and the like), which may not be suitable for minors. In the process of converting first caption data into second caption data, the caption converter 408 in the controller 110 replaces the words unsuitable for minors with other words in the second caption data or replaces the words with special characters, images or the like. Accordingly, the second caption data is generated by the caption converter 408 such that the words unsuitable for minors may be replaced by other words, special characters, images or the like.

In accordance with an embodiment of the present invention, in the process of determining the difficulty (to be specific, the degree of the difficulty) of each of the words included in the first caption data, the word dictionary 406 in the controller 110 separately extracts the words unsuitable for minors from among the words included in the first caption data. For example, if slang is extracted by the word dictionary 406, the caption converter 408 generates second caption data by replacing the slang with another word, a special character, an image, or the like.

It will be assumed that some of the first caption data in FIG. 1 has included the words unsuitable for minors. Accordingly, the caption converter 408 converts the sentence including the words unsuitable for minors into special characters. In FIG. 10, special characters "##########" instead of the sentence included in the first caption data may be displayed on the screen 190 as the second caption data 1020.

Figure 11A:
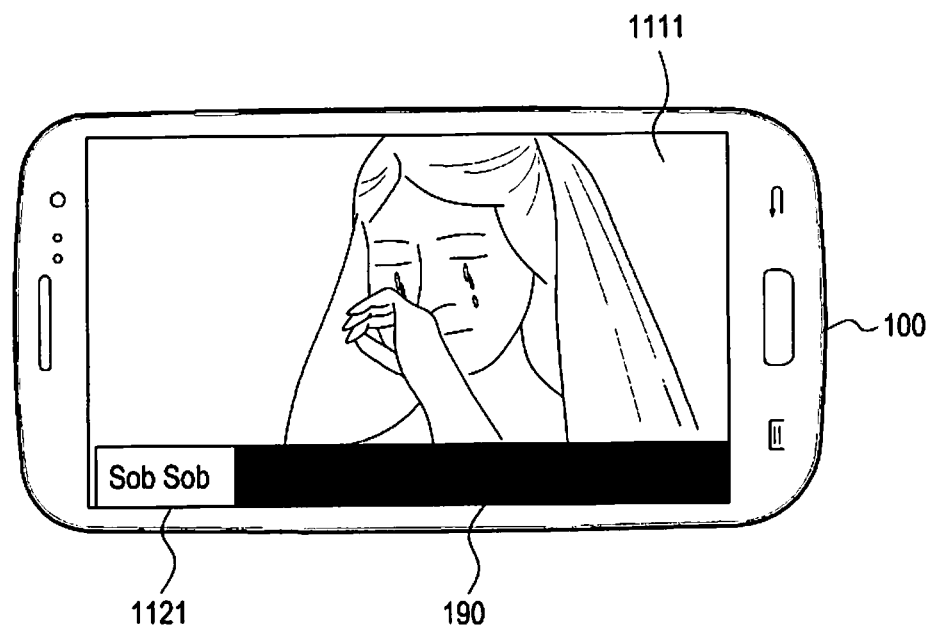
FIGS. 11A and 11B are diagrams illustrating further examples of displaying a caption in the mobile terminal illustrated in FIG. 1, according to an embodiment of the present invention.
Figure 11B:
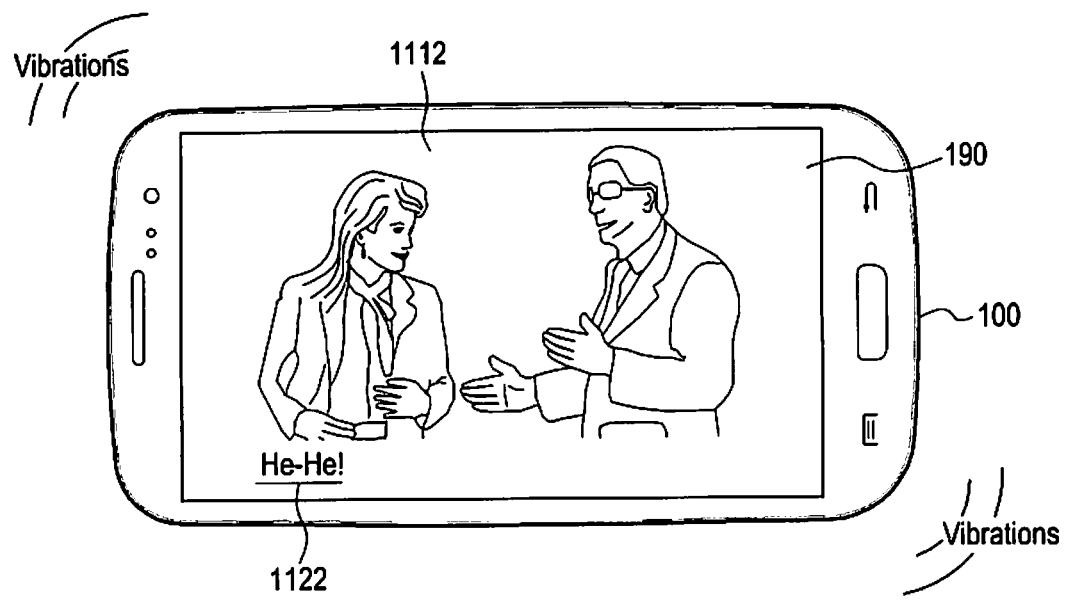

FIGS. 11A and 11B are diagrams illustrating another example of displaying a caption in the mobile terminal illustrated in FIG. 1, according to an embodiment of the present invention. It will be assumed that content data illustrated in FIGS. 11A and 11B includes video data 1111 and 1112 and first caption data. Second caption data 1121 and 1122 which is converted from the first caption data is displayed on the screen 190 in FIGS. 11A and 11B.

Referring to FIG. 11A, the second caption data 1121 includes an emotion word. In an embodiment of the present invention, the mobile terminal 100 provides special effects to the user depending on the contents of the content data.

The controller 110 according to an embodiment of the present invention analyzes first caption data, and if the first caption data includes a word or sentence associated with a specific emotion, the controller 110 provides the user with special effects capable of displaying the emotion. The first caption data in FIG. 11A may include "Sob Sob." Accordingly, the word dictionary 406 in the controller 110 separately extracts "Sob Sob" from the first caption data as a word indicating the specific emotion, especially the sadness. The effect generator 418 generates a specific command corresponding to "Sob Sob." The specific command will be assumed to be a command for displaying drops of water on the video data 1111 in an overlapping way while "Sob Sob" is displayed on the screen 190. The caption converter 408 converts the first caption data into the second caption data 1121 by adding the command to the first caption data. Accordingly, in FIG. 11A, the screen 190 displays drops of water on the video data 1111 in an overlapping way while the second caption data 1121 including "Sob Sob" is displayed on the screen 190.

The first caption data in FIG. 11B may include "He-He!." The word dictionary 406 in the controller 110 separately extracts "He-He!" from the first caption data as a word indicating the specific emotion, especially the laugh. The effect generator 418 generates a specific command corresponding to "He-He!." The specific command will be assumed to be a command for generating vibrations while "He-He!" is displayed on the screen 190. The caption converter 408 converts the first caption data into the second caption data 1122 by adding the command to the first caption data. Accordingly, in FIG. 11B, the mobile terminal 100 generates vibrations while the second caption data 1122 including "He-He!" is displayed on the screen 190.

Figure 12A:
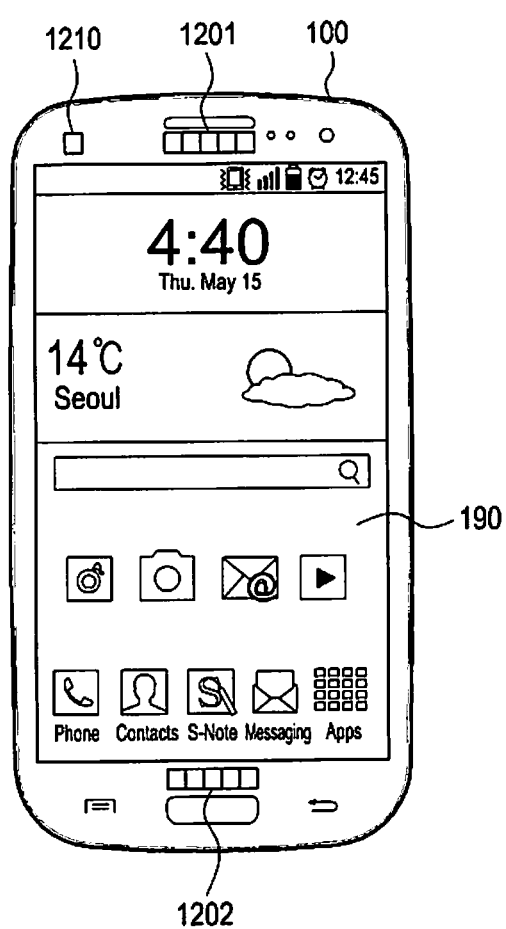
FIGS. 12A and 12B are diagrams illustrating examples of a mobile terminal for providing special effects to a user, according to an embodiment of the present invention.
Figure 12B:
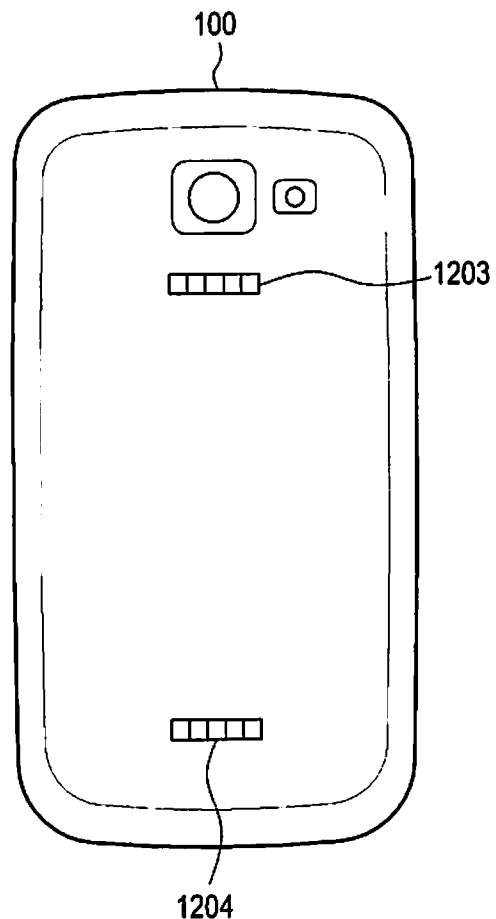

FIGS. 12A and 12B are diagrams illustrating an example of a mobile terminal for providing special effects to a user, according to an embodiment of the present invention.

FIG. 12A illustrates the front of the mobile terminal 100, and FIG. 12B illustrates the rear of the mobile terminal 100. As illustrated in FIG. 12A, the screen 190 is disposed on the mobile terminal 100, and Light Emitting Diode (LED) lightings 1201 and 1202 are disposed over and under the screen 190, respectively. A fragrance device 1210 for generating various fragrances (e.g., orange fragrance, jasmine fragrance, lemon fragrance and the like) is disposed on the left of the LED lighting 1201. The fragrance device 1210, under control of the controller 110, generates fragrances as special effects. As illustrated in FIG. 12B, LED lightings 1203 and 1204 may be disposed on the upper and lower portions of the rear of the mobile terminal 100. The LED lightings 1201, 1202, 1203 and 1024 emit at least one of red light, green light, blue light, yellow light, and white light (or other colors of light).

FIGS. 13A to 13E are diagrams illustrating an example of providing special effects to a user by the mobile terminal illustrated in FIGS. 12A and 12B, according to an embodiment of the present invention. It will be assumed in FIGS. 13A to 13E that the mobile terminal 100 displays video data and second caption data. In addition, it will be assumed that the video data is displayed in video areas 1311, 1312, 1313, 1314 and 1315, and the second caption data is displayed in caption areas 1321, 1322, 1323, 1324 and 1325.

Figure 13A:
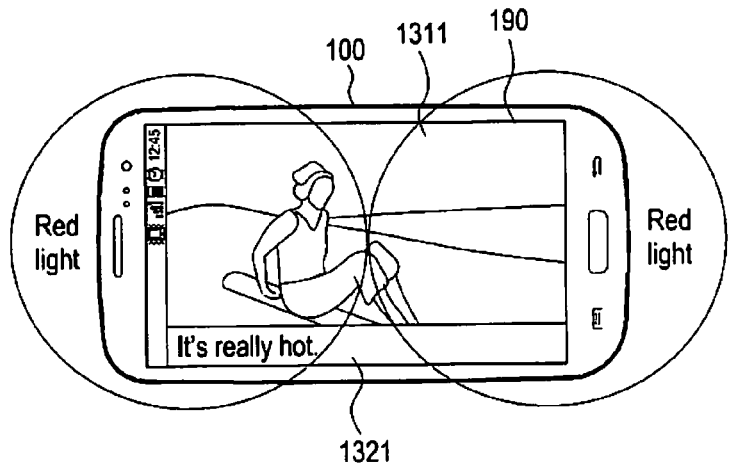
FIGS. 13A-13E are diagrams illustrating examples of providing special effects to a user by the mobile terminal illustrated in FIGS. 12A and 12B, according to an embodiment of the present invention.

Referring to FIG. 13A, the mobile terminal 100 provides the red light to the user by enabling (or turning on) a red LED. In accordance with an embodiment of the present invention, if a word associated with, for example, the heat, passion, hot and the like is displayed in the caption area 1321, or if an image including or associated with the word is displayed in the video area 1311, the controller 110 may enable the red LED. In FIG. 13A, a desert image may be displayed in the video area 1311, and the words or sentence "It's Really Hot" may be displayed in the caption area 1321.

In response to the video data and the second caption data, the mobile terminal 100 generates the red light as special effects by enabling the red LED.

In accordance with an embodiment of the present invention, the I/O module 160 or the screen 190 of the mobile terminal 100 receive a user input for adjusting illuminance of the red light from the red LED. In accordance with another embodiment of the present invention, if a word meaning, for example, the urgency, emergency, risk and the like is displayed in the caption area 1321, the controller 110 controls the mobile terminal 100 to generate special effects by continuously blinking the red LED two or three times.

Figure 13B:
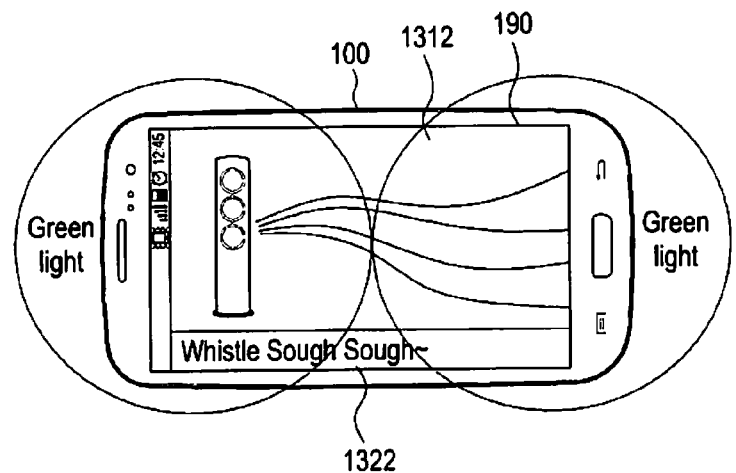

Referring to FIG. 13B, the mobile terminal 100 provides the green light to the user by enabling a green LED. In accordance with an embodiment of the present invention, if a word associated with, for example, the warmth, nature, green color, trees, mountain and the like is displayed in the caption area 1322, or if an image including or associated with the word is displayed in the video area 1312, the controller 110 enables the green LED. In FIG. 13B, a nature image may be displayed in the video area 1312, and the words or sentence "Whistle Sough Sough~" may be displayed in the caption area 1322. In response to the video data, the mobile terminal 100 generates the green light as special effects by enabling the green LED.

In accordance with an embodiment of the present invention, the I/O module 160 or the screen 190 of the mobile terminal 100 receives a user input for adjusting illuminance of the green light from the green LED. In accordance with another embodiment of the present invention, if a word meaning, for example, the environmental pollution, nature protection and the like is displayed in the caption area 1322, the controller 110 controls the mobile terminal 100 to generate special effects by continuously blinking the green LED two or three times.

Figure 13C:
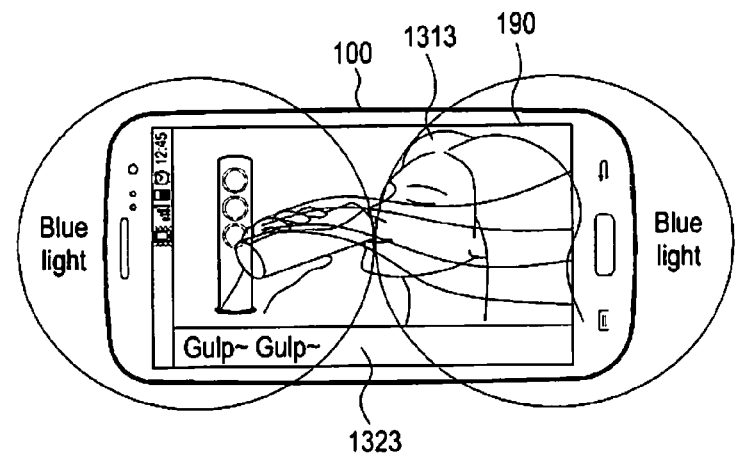

Referring to FIG. 13C, the mobile terminal 100 provides the blue light to the user by enabling a blue LED. In accordance with an embodiment of the present invention, if a word associated with, for example, the cool, cold, ice, sea, river, wind and the like is displayed in the caption area 1323, or if an image including or associated with the word is displayed in the video area 1313, the controller 110 enables the blue LED. In FIG. 13C, a sea image may be displayed in the video area 1313, and the words or sentence "Gulp~ Gulp~" is displayed in the caption area 1323. In response to the video data, the mobile terminal 100 generates the blue light as special effects by enabling the blue LED.

In accordance with an embodiment of the present invention, the I/O module 160 or the screen 190 of the mobile terminal 100 receives a user input for adjusting illuminance of the blue light from the blue LED. In accordance with another embodiment of the present invention, if a word meaning, for example, the waves, heavy rain, floods and the like is displayed in the caption area 1323, the controller 110 controls the mobile terminal 100 to generate special effects by continuously blinking the blue LED two or three times.

Figure 13D:
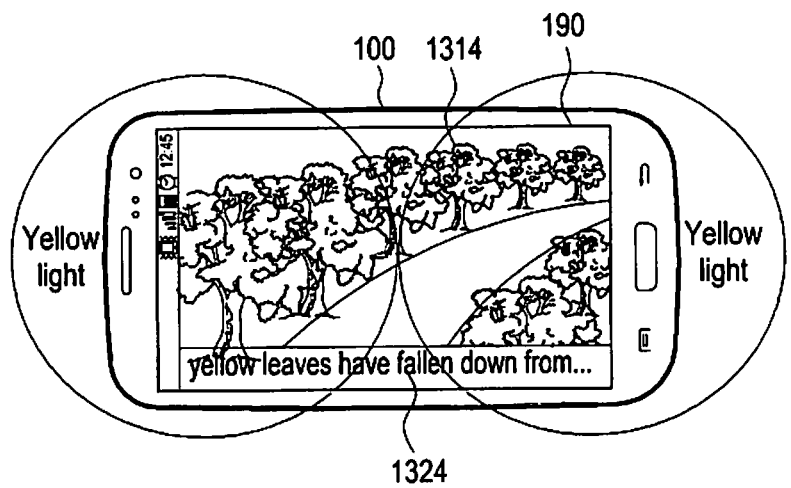

Referring to FIG. 13D, the mobile terminal 100 provides the yellow light to the user by enabling a yellow LED. In accordance with an embodiment of the present invention, if a word associated with, for example, the trance, yellow color, leaves, trees, autumn and the like is displayed in the caption area 1324, or if an image including or associated with the word is displayed in the video area 1314, the controller 110 enables the yellow LED. In FIG. 13D, a maple image is displayed in the video area 1314, and the words or sentence "Yellow Leaves Have Fallen Down from Roadside Trees" are/is displayed in the caption area 1324. In response to the video data, the mobile terminal 100 generates the yellow light as special effects by enabling the yellow LED.

In accordance with an embodiment of the present invention, the I/O module 160 or the screen 190 of the mobile terminal 100 receives a user input for adjusting illuminance of the yellow light from the yellow LED. In accordance with another embodiment of the present invention, if a word meaning, for example, the crisis, warning and the like is displayed in the caption area 1324, the controller 110 controls the mobile terminal 100 to generate special effects by continuously blinking the yellow LED two or three times.

Figure 13E:
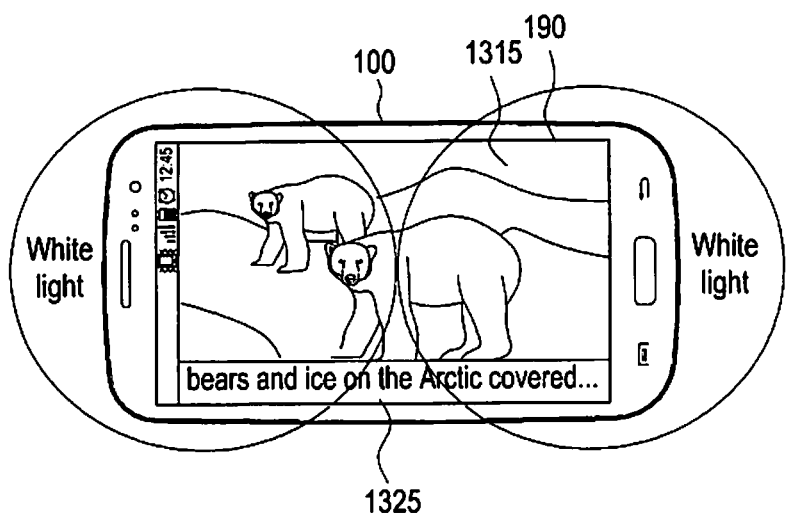

Referring to FIG. 13E, the mobile terminal 100 provides the white light to the user by enabling a white LED. In accordance with an embodiment of the present invention, if a word associated with, for example, the white color, coldness, purity, ice, snow and the like is displayed in the caption area 1325, or if an image including or associated with the word is displayed in the video area 1315, the controller 110 enables the white LED. In FIG. 13E, a snow image may be displayed in the video area 1315, and the words or sentence "Bears and Ice on the Arctic Covered with Snow" are/is displayed in the caption area 1325. In response to the video data, the mobile terminal 100 generates the white light as special effects by enabling the white LED.

In accordance with an embodiment of the present invention, the I/O module 160 or the screen 190 of the mobile terminal 100 receives a user input for adjusting illuminance of the white light from the white LED. In accordance with another embodiment of the present invention, if a word meaning, for example, the heavy snow, avalanches and the like is displayed in the caption area 1325, the controller 110 controls the mobile terminal 100 to generate special effects by continuously blinking the white LED two or three times.

Figure 14A:
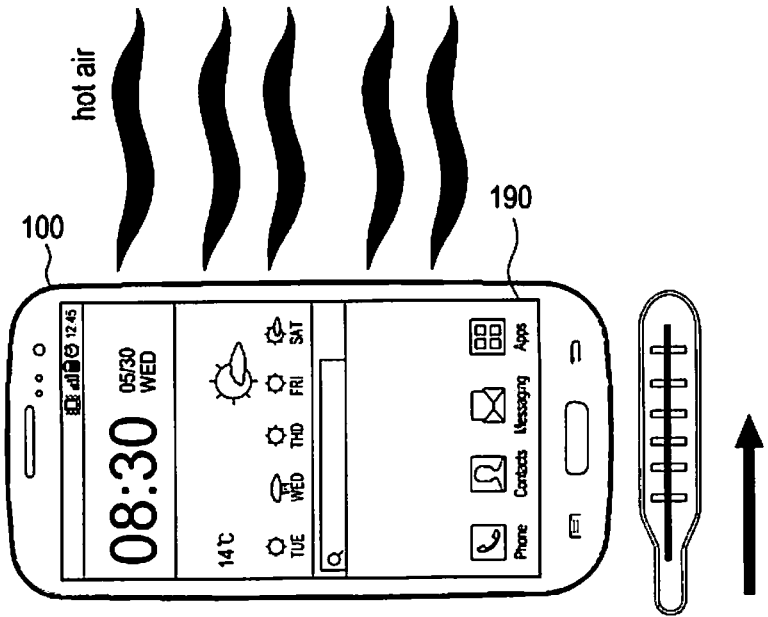
FIGS. 14A and 14B are diagrams illustrating examples of providing special effects to a user by the mobile terminal illustrated in FIG. 1, according to an embodiment of the present invention.
Figure 14B:
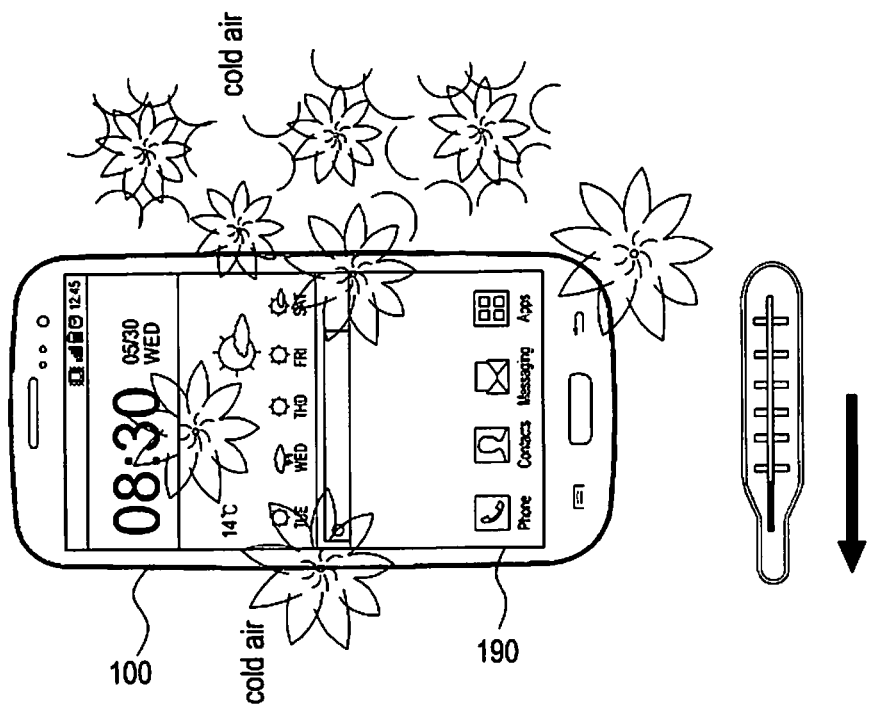

FIGS. 14A and 14B are diagrams illustrating another example of providing special effects to a user by the mobile terminal illustrated in FIG. 1, according to an embodiment of the present invention.

Referring to FIG. 14A, the mobile terminal 100 generates heat and provide the heat to the user as special effects. In accordance with an embodiment of the present invention, if a word associated with, for example, the heat, passion, hot and the like is included in the second caption data, the controller 110 controls the mobile terminal 100 to generate heat and provide the heat to the user. The I/O module 160 or the screen 190 of the mobile terminal 100 receives a user input for adjusting the amount of the generated heat.

Referring to FIG. 14B, the mobile terminal 100 generates a chill effect and provides the chill effect to the user as special effects. In accordance with an embodiment of the present invention, if a word associated with, for example, the coldness, cooling and the like is included in the second caption data, the controller 110 controls the mobile terminal 100 to generate a chill effect and provides the chill effect to the user. The I/O module 160 or the screen 190 of the mobile terminal 100 receives a user input for adjusting the amount of the generated chill.

Figure 15A:
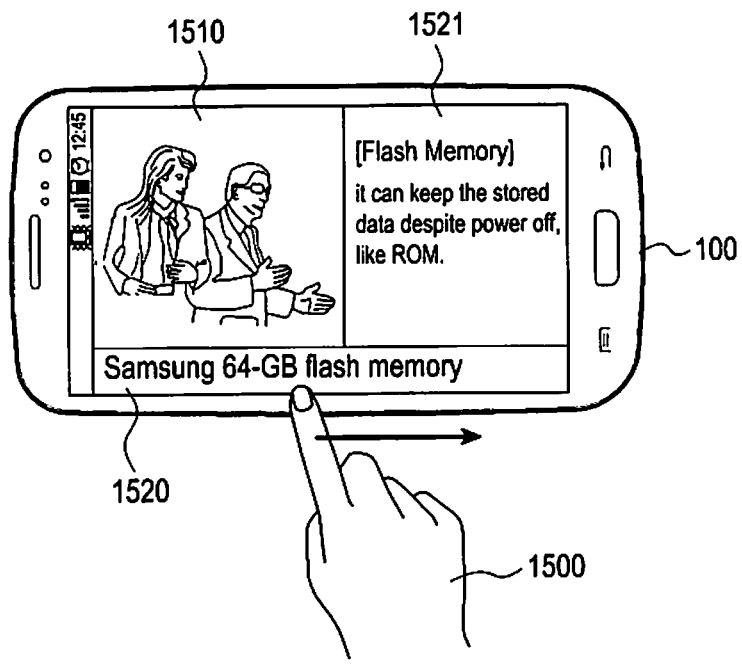
FIGS. 15A and 15B are diagrams illustrating examples of displaying second caption data in the mobile terminal illustrated in FIG. 1, according to an embodiment of the present invention.
Figure 15B:
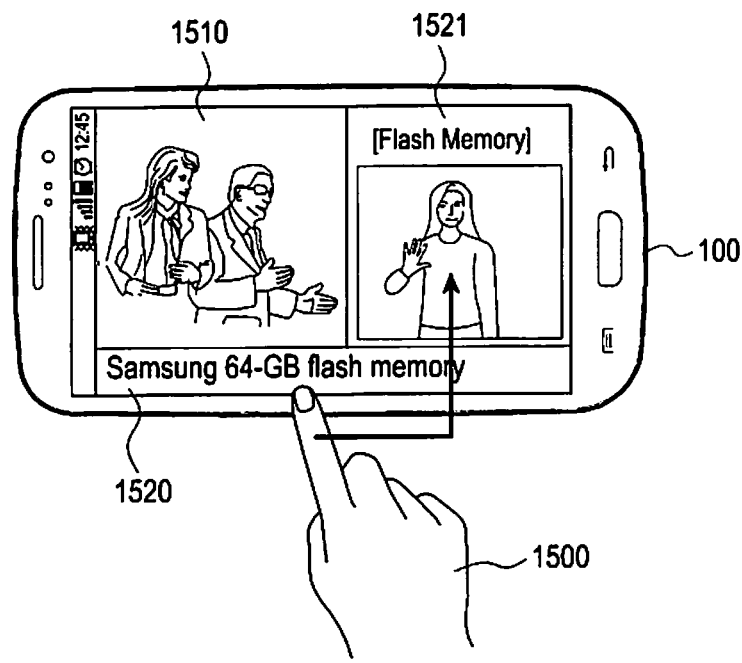

FIGS. 15A and 15B are diagrams illustrating an example of displaying second caption data in the mobile terminal illustrated in FIG. 1, according to an embodiment of the present invention. It will be assumed in FIGS. 15A and 15B that the mobile terminal 100 displays video data and second caption data. It will also be assumed that the video data and the second caption data are displayed in a video area 1510 and a caption area 1520, respectively.

Referring to FIG. 15A, the caption area 1520 is disposed in a lower portion of the video area 1510, and a caption is displayed in the caption area 1520 on a line basis. If a term hard to understand (e.g., a high-difficulty word) is included in the caption that is displayed in the caption area 1520, a user 1500 may request a description of the term from the mobile terminal 100 by touching the term.

In FIG. 15A, the user 1500 may request the mobile terminal 100 to explain a technical term "Flash." The user 1500 enters a user input for the request by touching the portion where the word "'Flash'" is displayed in the caption area 1520, and then sliding the finger from left to right while keeping the touch. Upon receiving the user input, the mobile terminal 100 displays explanation data included in the second caption data on the screen 190. The mobile terminal 100 displays the explanation data on the right side of the video area 1510 in an overlapping way. The area where the explanation data is displayed will be referred to as an explanation area 1521, in which not only the explanation data but also the words represented by the explanation data may be displayed together. Accordingly, the word "Flash Memory" is displayed in the explanation area 1521 together with the explanation of the flash memory.

Referring to FIG. 15B, the caption area 1520 is disposed in a lower portion of the video area 1510, and a caption is displayed in the caption area 1520 on a line basis. If a term hard to understand (e.g., a high-difficulty word) is included in the caption that is displayed in the caption area 1520, the user 1500 may touch a term to request the mobile terminal 100 to display a first language-based sign language indicating the term on the screen 190. In FIG. 15B, the user 1500 may request the mobile terminal 100 to display a technical term "Flash" in a first language-based sign language. The user 1500 may enter a user input for the request by touching the portion where the word "Flash" is displayed in the caption area 1520 and then sliding the finger from left to right and from bottom to top while keeping the touch.

Upon receiving the user input, the mobile terminal 100 displays, on the screen 190, a first language-based sign language animation corresponding to the first language-based sign language meaning the term. In FIG. 15B, the mobile terminal 100 displays the first language-based sign language animation on the right side of the video area 1510 in an overlapping way, in a sign language area 1530. In the sign language area 1530 may be displayed not only the first language-based sign language animation but also the words or sentence represented by the first language-based sign language animation. Accordingly, the word "Flash Memory" is displayed in the sign language area 1530 together with the first language-based sign language animation corresponding to the flash memory.

Figure 16A:
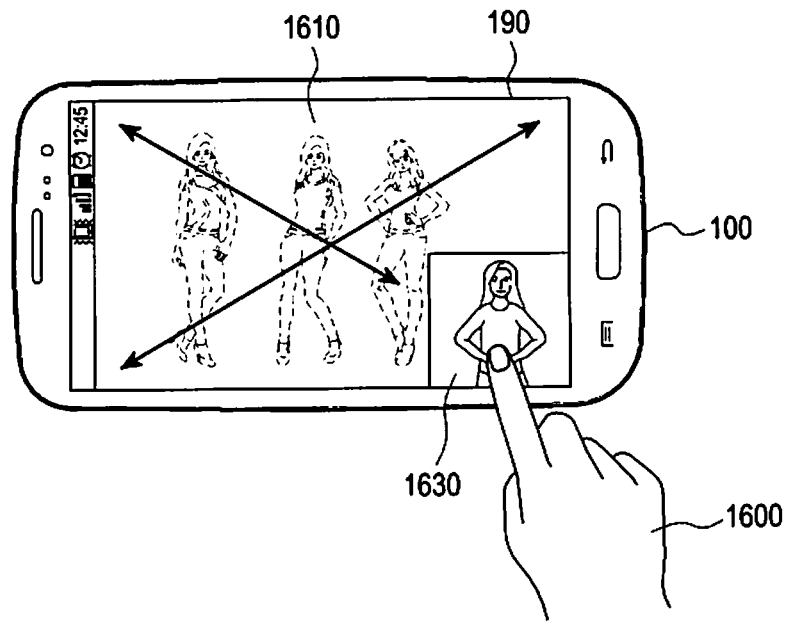
FIGS. 16A-16C are diagrams illustrating examples of displaying a first language-based sign language animation in the mobile terminal illustrated in FIG. 1, according to an embodiment of the present invention.
Figure 16B:
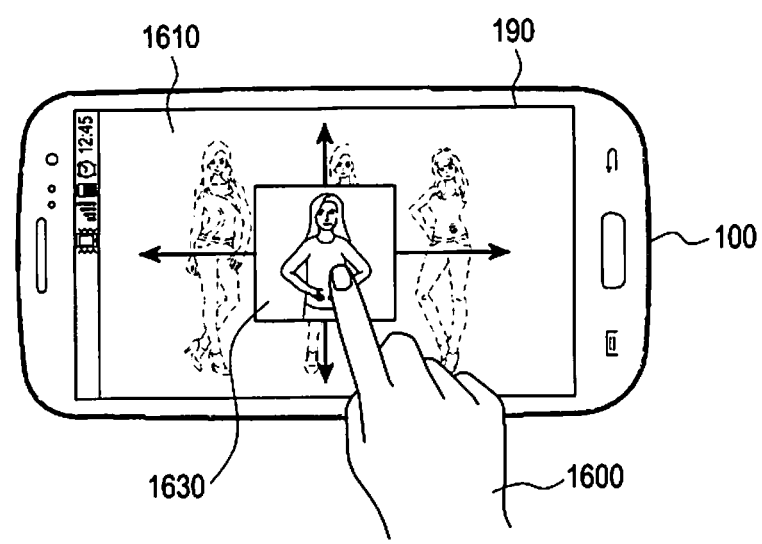
Figure 16C:
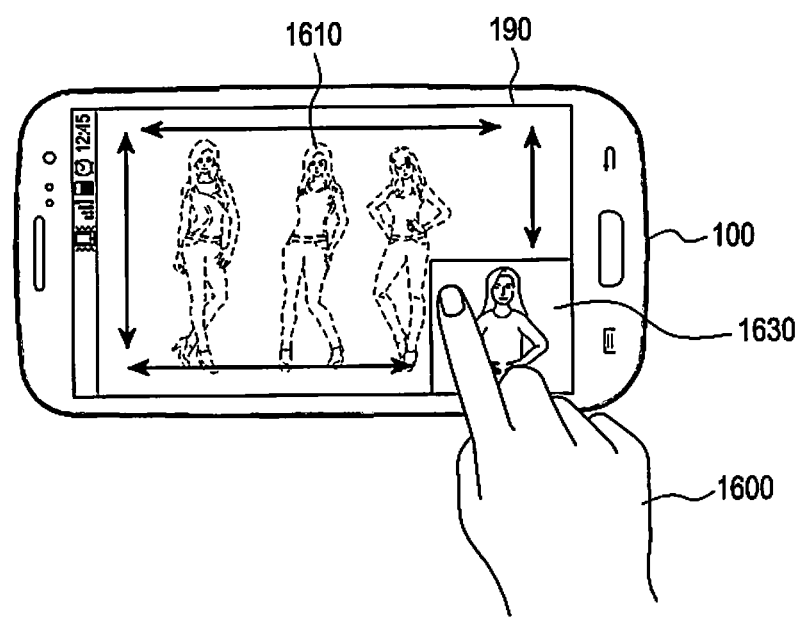

FIGS. 16A to 16C are diagrams illustrating an example of displaying a first language-based sign language animation in the mobile terminal illustrated in FIG. 1, according to embodiment of the present invention. It will be assumed in FIGS. 16A-16C that the mobile terminal 100 displays video data and a first language-based sign language animation. It will also be assumed that the video data and the first language-based sign language animation are displayed in a video area 1610 and a sign language area 1630, respectively. In addition, it will be assumed that the sign language area 1630 appears on the screen 190, overlapping the video area 1610.

Referring to FIG. 16A, the sign language area 1630 where a first language-based sign language animation is displayed is disposed in the lower right portion of the video area 1610. A user 1600 may change the position of the sign language area 1630 on the screen 190 by touching at least a portion of the sign language area 1630 and then sliding the finger diagonally while keeping the touch.

Referring to FIG. 16B, the sign language area 1630 where a first language-based sign language animation is displayed is disposed in the center of the video area 1610. The user 1600 may change the position of the sign language area 1630 on the screen 190 by touching at least a portion of the sign language area 1630 and then sliding the finger up, down, left and right while keeping the touch. Accordingly, in FIG. 16B, the user 1600 may move the sign language area 1630 to the center between the left and the right, or the center between the top and the bottom on the video area 1610.

Referring to FIG. 16C, the sign language area 1630 where a first language-based sign language animation is displayed is disposed in the lower right portion of the video area 1610. The user 1600 may change the position of the sign language area 1630 on the screen 190 by touching at least a portion of the sign language area 1630 and then sliding the finger up, down, left and right while keeping the touch. Accordingly, in FIG. 16C, the user 1600 may move the sign language area 1630 to the edges on the left and the right, or the edges on the top and the bottom on the video area 1610.

Figure 17A:
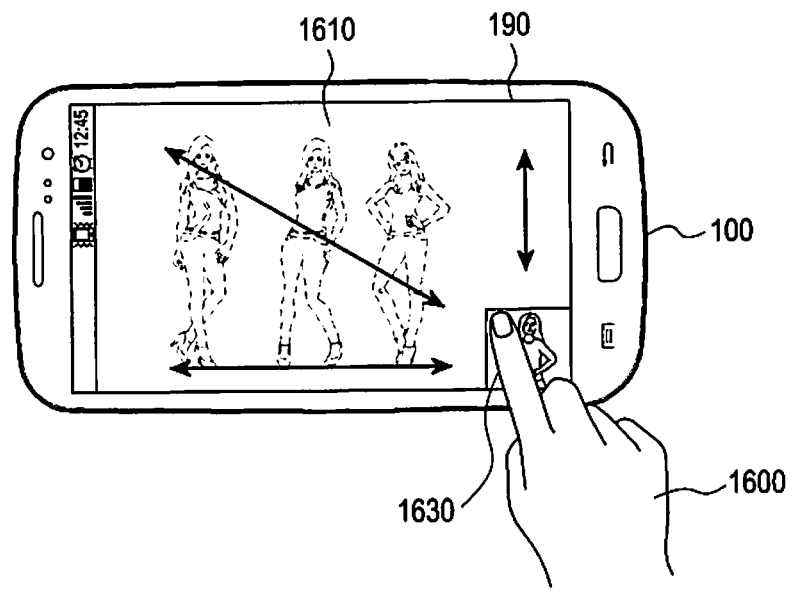
FIGS. 17A and 17B are diagrams illustrating examples of displaying a first language-based sign language animation in the mobile terminal illustrated in FIG. 1, according to an embodiment of the present invention.
Figure 17B:
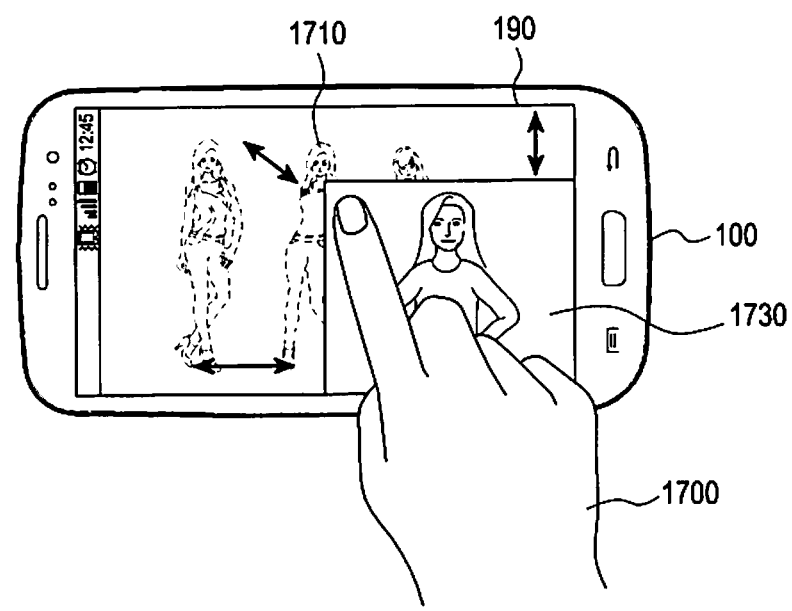

FIGS. 17A and 17B are diagrams illustrating another example of displaying a first language-based sign language animation in the mobile terminal illustrated in FIG. 1, according to an embodiment of the present invention. It will be assumed in FIGS. 17A and 17B that the mobile terminal 100 displays video data and a first language-based sign language animation. Accordingly, both of a video area 1710 where video data is displayed and a sign language area 1730 where a first language-based sign language animation is displayed may appear on the screen 190.

As illustrated in FIGS. 17A and 17B, a user 1700 may increase or decrease the size of the sign language area 1730 on the screen 190, in the up, down, left and right directions. The user 1700 may increase or decrease the size of the sign language area 1730 by touching the sign language area 1730 displayed on the screen 190 with the finger. In FIG. 17A, the user 1700 may enter a user input for increasing the size of the sign language area 1730 to the mobile terminal 100, by touching the upper left corner of the sign language area 1730 on the screen 190 and then sliding the finger in the left, up or diagonal direction while keeping the touch. Upon receiving the user input, the mobile terminal 100 increases the size of the sign language area 1730 on the screen 190 as illustrated in FIG. 17B.

Referring to FIG. 17B, the user 1700 may decrease the size of the sign language area 1730 that is disposed in the lower right portion of the screen 190, by touching the sign language area 1730 with the finger. In FIG. 17B, the user 1700 may enter a user input for decreasing the size of the sign language area 1730 to the mobile terminal 100, by touching the upper left corner of the sign language area 1730 on the screen 190 and then sliding the finger in the right, down or diagonal direction while keeping the touch. Upon receiving the user input, the mobile terminal 100 decreases the size of the sign language area 1730 on the screen 190 as illustrated in FIG. 17A.

FIGS. 18A-18D are diagrams illustrating another example of displaying a first language-based sign language animation in the mobile terminal illustrated in FIG. 1, according to an embodiment of the present invention.

Figure 18A:
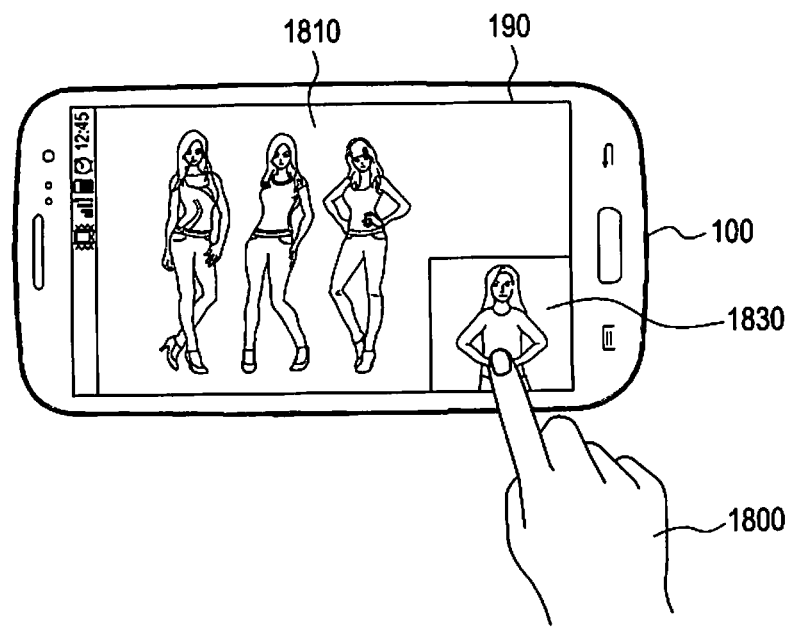
FIGS. 18A-18D are diagrams illustrating examples of displaying a first language-based sign language animation in the mobile terminal illustrated in FIG. 1, according to an embodiment of the present invention.

Referring to FIG. 18A, a sign language area 1830 where a first language-based sign language animation is displayed is disposed in the lower right portion of a video area 1810 where video data is displayed on the screen 190. A user 1800 may request the mobile terminal 100 to output video data and a first language-based sign language animation in the form of FIG. 18B by, for example, double-touching at least a portion of the sign language area 1830 in which the first language-based sign language animation is output.

Figure 18B:
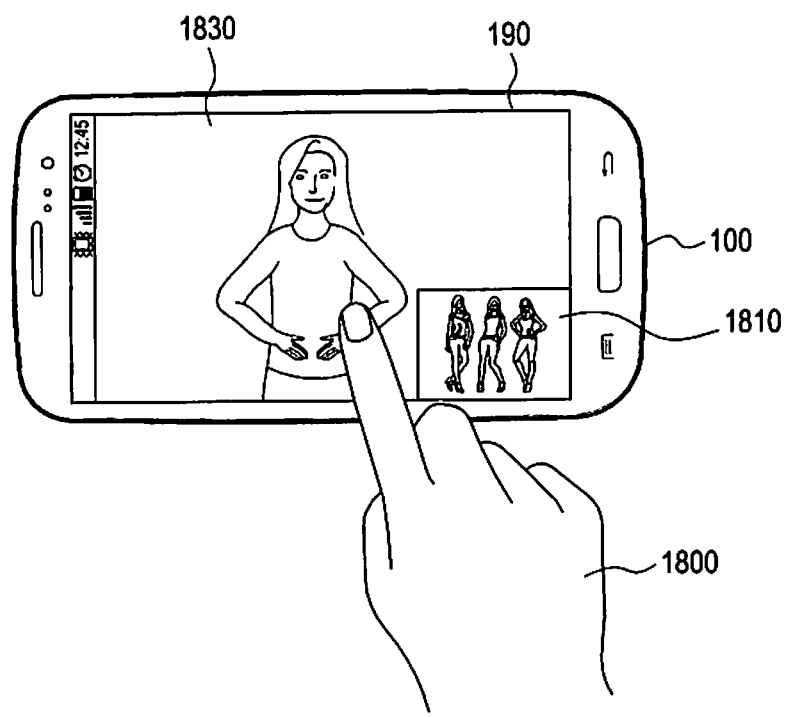

If the video area 1810 where video data is displayed is disposed in the lower right portion of the sign language area 1830 where a first language-based sign language animation is displayed, as illustrated in FIG. 18B, the user 1800 may request the mobile terminal 100 to output video data and a first language-based sign language animation in the form of FIG. 18A by, for example, double-touching at least a portion of the video area 1810.

Figure 18C:
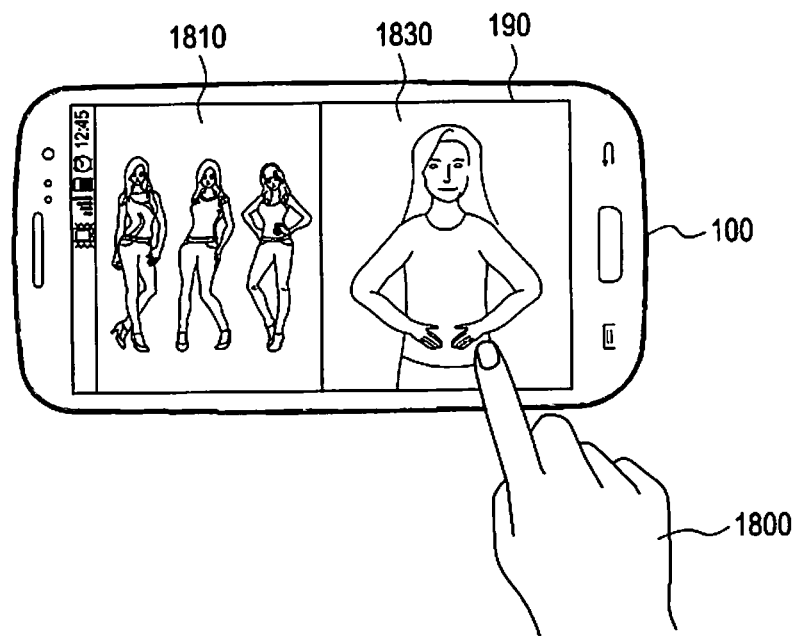

Referring to FIG. 18C, the user 1800 may request the mobile terminal 100 to display second caption data while video data and a first language-based sign language animation is displayed. The user 1800 may select the position (e.g., a caption area 1820) in which the user 1800 desires to display the second caption data on the screen 190 by, for example, double-touching the position. Accordingly, the mobile terminal 100 determines a lower portion of the video area 1810 and the sign language area 1830 as the caption area 1820 and outputs the second caption data in the caption area 1820 on a line basis, as illustrated in FIG. 18D.

Figure 18D:
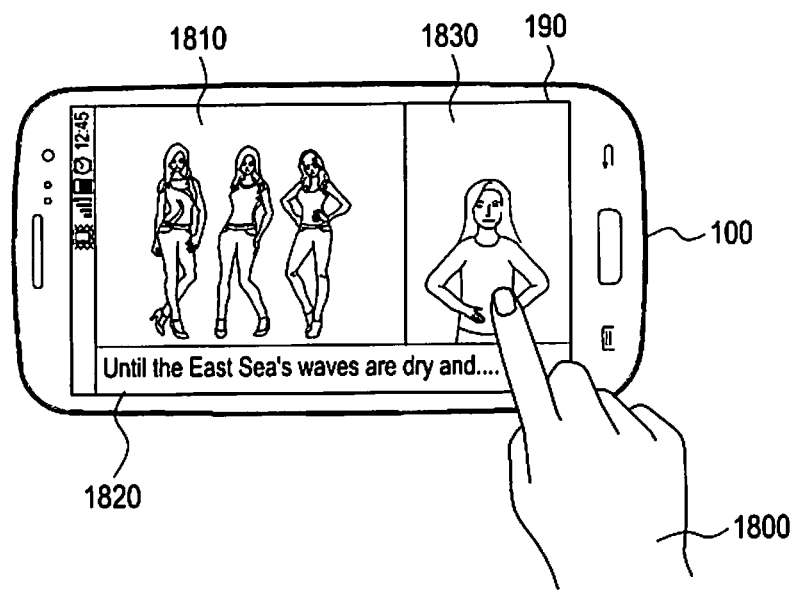

The user 1800 may request the mobile terminal 100 not to display the second caption data by, for example, double-touching an area other than the caption area 1820 where the second caption data is displayed, while the second caption data is output in a lower portion of the video data and the first language-based sign language animation as illustrated in FIG. 18D. Accordingly, the mobile terminal 100 displays only the video data and the first language-based sign language animation in the video area 1810 and the sign language area 1830 on the screen 190 as illustrated in FIG. 18C.

Figure 19A:
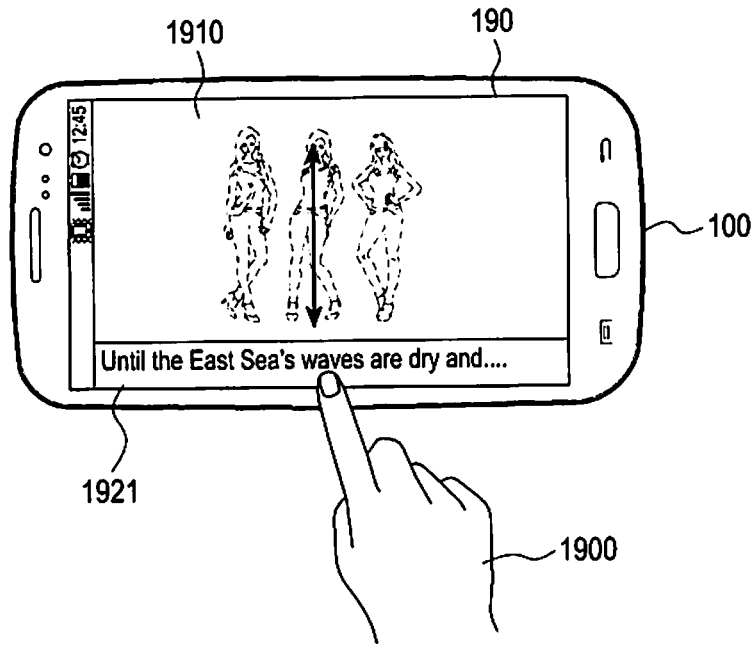
FIGS. 19A and 19B are diagrams illustrating examples of displaying a caption in the mobile terminal illustrated in FIG. 1, according to an embodiment of the present invention.
Figure 19B:
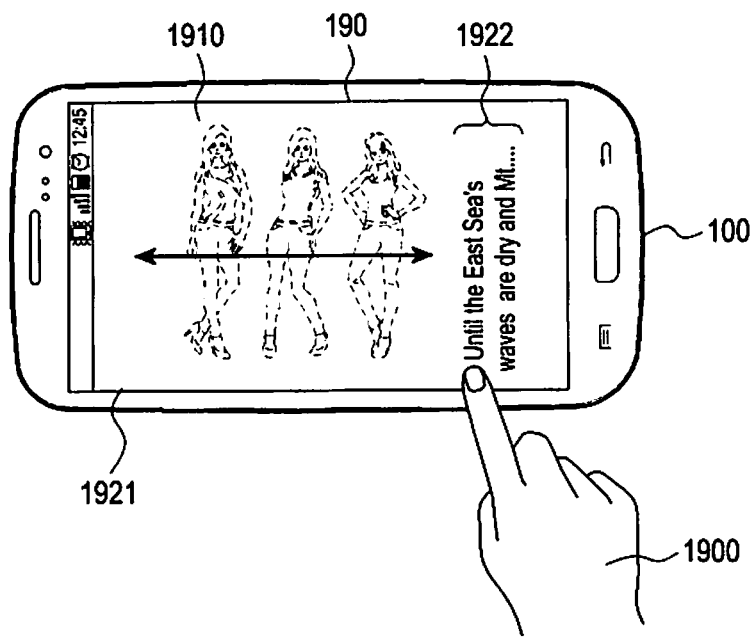

FIGS. 19A and 19B are diagrams illustrating an example of displaying a caption in the mobile terminal illustrated in FIG. 1, according to an embodiment of the present invention. It will be assumed in FIGS. 19A and 19B that the mobile terminal 100 displays video data and second caption data converted from first caption data. It will also be assumed that the video data is displayed in a video area 1910 and the second caption data is displayed in caption areas 1921 and 1922.

In FIGS. 19A and 19B, a user 1900 may enter, to the mobile terminal 100, a user input for moving the position of the caption areas 1921 and 1922 on the screen 190.

Referring to FIG. 19A, the second caption data is output in a lower portion of the video data on a line basis. In other words, the caption area 1921 is disposed in a lower portion of the video area 1910. The user 1900 may move up or down the position of the caption area 1921 on the screen 190 by touching at least a portion of the caption area 1921, in which the second caption data is output and then sliding the finger up or down while keeping the touch.

Referring to FIG. 19B, the second caption data is output on the right side of the video area 1910 in which video data is output, in two lines, overlapping the video data. The user 1900 may move left or right the position of the caption area 1922 on the video area 1910 by touching at least a portion of the caption area 1922 in which the second caption data is output and then sliding the finger left or right while keeping the touch.

Figure 20:
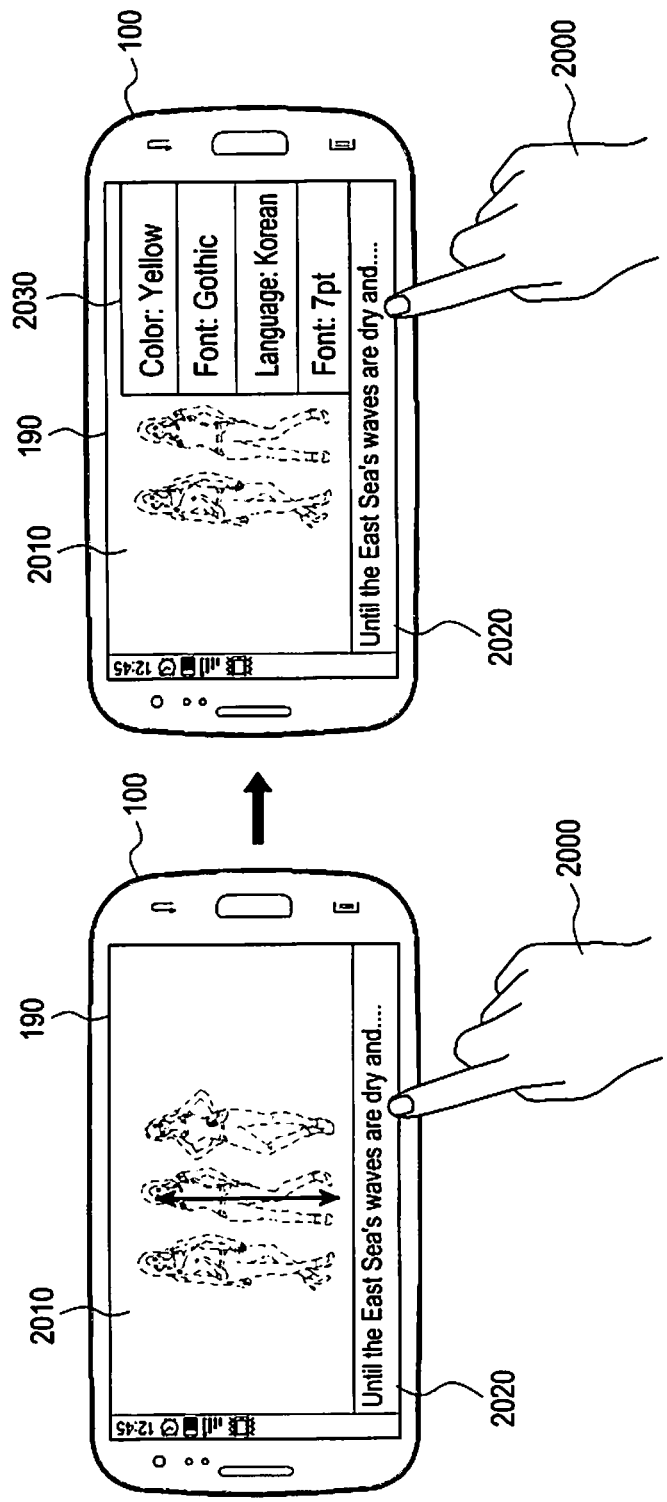
FIG. 20 is a diagram illustrating another example of displaying a caption in the mobile terminal illustrated in FIG. 1, according to an embodiment of the present invention.

FIG. 20 is a diagram illustrating another example of displaying a caption in the mobile terminal illustrated in FIG. 1, according to an embodiment of the present invention. It will be assumed in FIG. 20 that the mobile terminal 100 displays video data and second caption data converted from first caption data. It will also be assumed that the video data and the second caption data are displayed in a video area 2010 and a caption area 2020, respectively.

When the video data and the second caption data are displayed on the screen 190 as in FIG. 20, a user 2000 may enter, to the mobile terminal 100, a user input for displaying an option window 2030 for caption settings. In FIG. 20, the user 2000 may enter the user input for displaying the option window 2030 by touching at least a portion of the caption area 2020 in which the second caption data is output.

Upon receiving the user input, the mobile terminal 100 displays the option window 2030 used for changing settings of the second caption data, in the video area 2010 or the caption area 2020 in an overlapping manner.

As illustrated in FIG. 20, through the option window 2030, the user 2000 may enter his/her desired font color, font type, language, font size and the like. The controller 110 changes the second caption data depending on the font color, font type, language, font size and the like, which are entered through the option window 2030, and display the changed second caption data.

Figure 21:
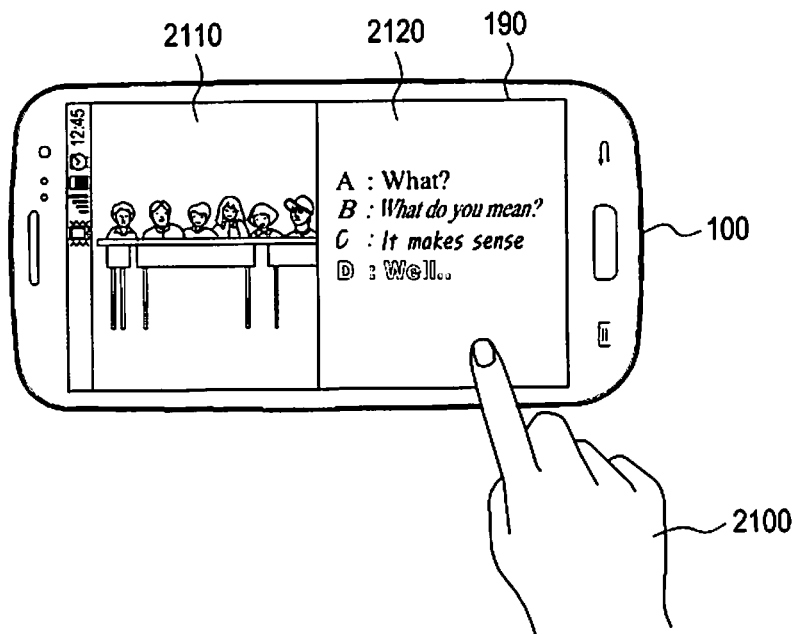
FIG. 21 is a diagram illustrating another example of displaying a caption in the mobile terminal illustrated in FIG. 1, according to an embodiment of the present invention.

FIG. 21 is a diagram illustrating another example of displaying a caption in the mobile terminal illustrated in FIG. 1, according to an embodiment of the present invention. It will be assumed in FIG. 21 that the mobile terminal 100 displays video data and second caption data converted from first caption data. It will also be assumed that the video data and the second caption data are displayed in a video area 2110 and a caption area 2120, respectively.

In an embodiment of the present invention, a user 2100 may determine the position (e.g., the position of the caption area 2120) where the second caption data is to be output on the screen 190 by touching at least a portion of the screen 190. Accordingly, in FIG. 21, the user 2100 may perform an operation of splitting the screen 190 in half. This operation by the user 2100 may be entered to the mobile terminal 100 as a user input. Depending on the user input, the controller 110 outputs the second caption data in the caption area 2120 on the screen 190 or changes the output position of the caption area 2120 on the screen 190. In FIG. 21, the mobile terminal 100 outputs the video data on the left side of the screen 190 and the second caption data on the right side of the screen 190, depending on the user input. In other words, the video area 2110 may be disposed on the left side of the screen 190, and the caption area 2120 may be disposed on the right side of the screen 190. As described above, the mobile terminal 100 changes the output positions of the video data and the second caption data on the screen 190 depending on the user input.

Figure 22:
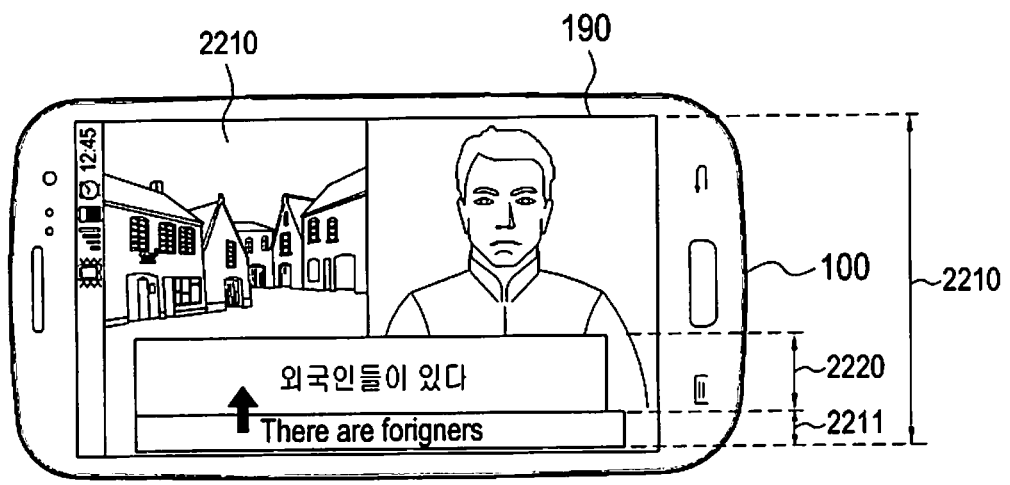
FIG. 22 is a diagram illustrating yet another example of displaying a caption in the mobile terminal illustrated in FIG. 1 is a diagram illustrating.

FIG. 22 is a diagram illustrating yet another example of displaying a caption in the mobile terminal illustrated in FIG. 1, according to an embodiment of the present invention. It will be assumed in FIG. 22 that the mobile terminal 100 displays video data and second caption data converted from first caption data. It will also be assumed that the video data and the second caption data are displayed in a video area 2210 and a caption area 2220, respectively.

The video data illustrated in FIG. 22 includes an open caption 2211. The second caption data according to an embodiment of the present invention corresponds to a closed caption, and may be displayed in the caption area 2220, overlapping the video data.

As regards the open caption 2211 included in the video data, the user may hardly change the position of the caption at his or her discretion. Accordingly, the open caption 2211 is covered by the second caption data displayed on the screen 190 in such a way that the video data overlaps the open caption 2211. If the open caption 2211 is covered by the caption area 2220 in which the second caption data is displayed, the controller 110 arbitrarily changes the position of the caption area 2220 in which the second caption data is output. In accordance with an embodiment of the present invention, the controller 110 changes the position of the caption area 2220 in which the second caption data is output, depending on the user input. In FIG. 22, the controller 110 may determine an upper portion of the open caption 2211 as a position of the caption area 2220 in which the second caption data is output, and output the second caption data in the determined portion.

Figure 23:
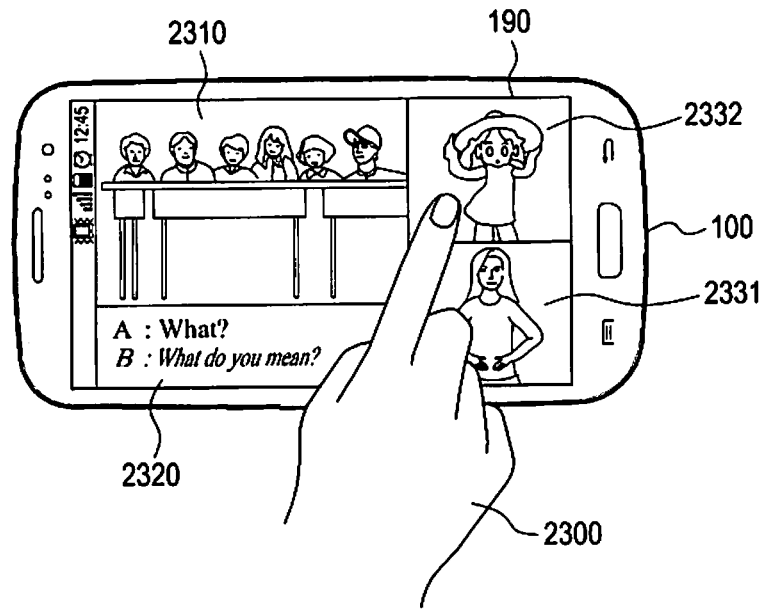
FIG. 23 is diagram illustrating still another example of displaying a caption in the mobile terminal illustrated in FIG. 1 is a diagram illustrating.

FIG. 23 is a diagram illustrating still another example of displaying a caption in the mobile terminal illustrated in FIG. 1, according to an embodiment of the present invention. It will be assumed in FIG. 23 that the mobile terminal 100 displays video data and second caption data converted from first caption data.

Referring to FIG. 23, a caption area 2320 where second caption data is displayed appears in a lower portion of a video area 2310 where video data is displayed. A user 2300 may request the mobile terminal 100 to display a first language-based sign language animation or a second language-based sign language animation by touching at least a portion of the area (e.g., the caption area 2320) in which the second caption data is displayed on the screen 190. This touch may be entered to the mobile terminal as a user input for requesting a first language-based sign language animation or a second language-based sign language animation.

The sign language translator 410 in the controller 110 translates a first language caption included in first caption data into a first language-based sign language, and the sign language generator 412 generates a first language-based sign language animation based on the first language-based sign language. The foreign language-based sign language translator 414 in the controller 110 translates the first language caption included in the first caption data into a foreign language-based sign language, and the foreign language-based sign language generator 416 generates a second language-based sign language animation based on the second language-based sign language. In an embodiment of the present invention, the sign language generator 412 and the foreign language-based sign language generator 416 generates an animation in which an avatar performs a sign language operation, as a first language-based sign language animation or a second language-based sign language animation, as illustrated in FIG. 23.

The user 2300 may select, on the screen 190, the position of each of the caption area 2320 in which second caption data is displayed, a first language-based sign language area 2331 in which a first language-based sign language animation is displayed, and a second language-based sign language area 2332 in which a second language-based sign language animation is displayed. In FIG. 23, the user 2300 may drag the second language-based sign language area 2332 in which a second language-based sign language animation is displayed, to an upper portion of the screen 190. As stated above, the user 2300 may enter the position of the second language-based sign language area 2332 to the mobile terminal 100. Depending on the user input, the screen 190 in FIG. 23 outputs the caption area 2320 in a lower portion of the video area 2310, the second language-based sign language area 2332 in an upper right portion of the video area 2310, and the first language-based sign language area 2331 in a lower right portion of the video area 2310.

Figure 24:
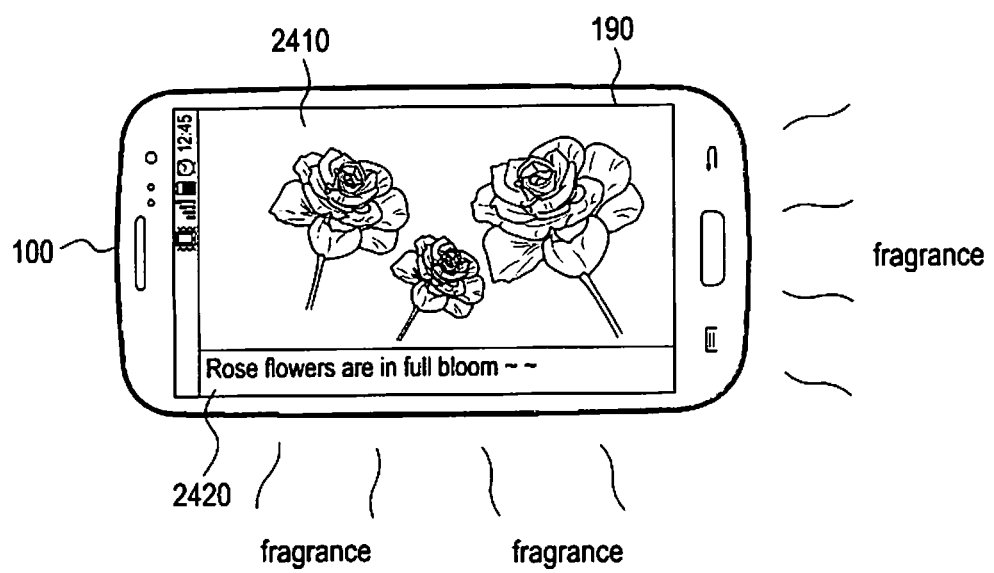
FIG. 24 is a diagram illustrating still another example of displaying a caption in the mobile terminal illustrated in FIG. 1 is a diagram illustrating.

FIG. 24 is a diagram illustrating still another example of outputting special effects in the mobile terminal illustrated in FIG. 1, according to an embodiment of the present invention. It will be assumed in FIG. 24 that that the mobile terminal 100 displays video data and second caption data converted from first caption data. It will also be assumed that the video data and the second caption data are displayed in a video area 2410 and a caption area 2420, respectively.

As mentioned in the description of FIGS. 11A and 11B, the mobile terminal 100 provides special effects to the user depending on the contents of the content data. The controller 110 according to an embodiment of the present invention analyzes the first caption data, and if the words or sentence associated with special effects are included in the first caption data, the controller 110 provides the special effects to the user. The first caption data in FIG. 24 may include the words or sentence "Acacia Flowers are in Full Bloom ~~." The word dictionary 406 in the controller 110 separately extracts "Acacia Flowers" from the first caption data as the words indicating special effects. The effect generator 418 generates a special command corresponding to the "Acacia Flowers." The specific command will be assumed to be a command for creating the fragrance of acacia flowers while the words "Acacia Flowers" are displayed in the caption area 2420 in which the second caption data is displayed.

The caption converter 408 converts the first caption data into second caption data by adding the command to the first caption data. Accordingly, in FIG. 24, the mobile terminal 100 creates the fragrance of acacia flowers and provides the fragrance to the user, while the second caption data including the words "Acacia Flowers" is displayed in the caption area 2420.

It can be appreciated that the method of controlling a mobile terminal according to an embodiment of the present invention may be implemented in the form of hardware, software or a combination thereof. The software may be stored in a volatile or nonvolatile storage device (e.g., an erasable/re-writable ROM), a memory (e.g., a RAM, a memory chip, a memory device, a memory Integrated Circuit (IC) or the like), or an optically or magnetically recordable machine (e.g., computer)-readable storage medium (e.g., Compact Disk (CD), Digital Versatile Disk (DVD), magnetic disk, magnetic tape, or the like). The method of controlling a mobile terminal according to an embodiment of the present invention may be implemented by a computer or a mobile terminal, which includes controller and a memory. It will be apparent to those of ordinary skill in the art that the memory is an example of a machine-readable storage medium suitable to store a program or programs including instructions for implementing embodiments of the present invention. Therefore, the mobile terminal according to an embodiment of the present invention may include a machine (e.g., a computer or the like)—readable storage medium storing a program or programs including codes for implementing the apparatus and method as defined by the appended claims and their equivalents. This program may be electronically carried on any medium such as communication signals that are transmitted through wired/wireless connections.

The mobile terminal receives and stores the program from a program server, to which the mobile terminal is connected. The program server may include a memory for storing a program including instructions for implementing the control method, and also storing information needed for the control method, a communication unit for performing wired/wireless communication with the mobile terminal, and a controller for transmitting the program to the mobile terminal automatically or at the request of the mobile terminal.

As is apparent from the foregoing description, the present invention provides a mobile terminal for allowing the hearing impaired to easily recognize technical terms included in a caption or emotions associated with the caption, and a method for controlling the same.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for displaying caption data in a device, the method comprising:
receiving content data including video data;
if original caption data is included in the content data, performing error checking for the original caption data and generating corrected caption data by correcting one or more errors of the original caption data;
extracting one or more high-difficulty words from the corrected caption data;
generating explanation data corresponding to each of the one or more high-difficulty words, wherein the explanation data includes data for explaining each of the one or more high-difficulty words;
determining at least one special effect corresponding to at least one word included in the original caption data or the explanation data, wherein the at least one special effect includes vibrations, color light, heat, chill, or fragrance corresponding to the at least one word included in the original caption data or the explanation data; and
while displaying the video data, simultaneously providing the corrected caption data, the explanation data, and the at least one special effect.

2. The method of claim 1, wherein simultaneously providing the corrected caption data, the explanation data, and the at least one special effect comprises:
if a user input for displaying a caption is received,
simultaneously displaying the corrected caption data, the explanation data, and the at least one special effect.

3. The method of claim 2, before extracting the one or more high-difficulty words from the corrected caption data, further comprising:
determining whether the one or more high-difficulty words are included in the corrected caption that is displayed on a display of the device.

4. A method for displaying caption data in a device, the method comprising:
receiving content data including video data;
if original caption data is included in the content data, performing error checking for the original caption data and generating corrected caption data by correcting one or more errors of the original caption data;
extracting one or more high-difficulty words from the corrected caption data;
generating a sign language animation corresponding to each of the one or more high-difficulty words, wherein the sign language animation includes explanation data for explaining each of the one or more high-difficulty words;
determining at least one special effect corresponding to at least one word included in the original caption data or the explanation data, wherein the at least one special effect includes vibrations, color light, heat, chill, or fragrance corresponding to the at least one word included in the original caption data or the explanation data; and
while displaying the video data, simultaneously providing the corrected caption data, the sign language animation, and the at least one special effect.

5. The method of claim 4, wherein simultaneously providing the corrected caption data, the sign language animation, and the at least one special effect comprises:
if a user input for displaying a caption is received,
simultaneously displaying the corrected caption data, the sign language animation, and the at least one special effect.

6. The method of claim 5, before extracting the one or more high-difficulty words from the corrected caption data, further comprising:
determining whether the one or more high-difficulty words are included in the corrected caption data that is displayed on a display of the device.

7. The method of claim 4, further comprising:
if a user input for displaying an another language-based sign language animation is received, translating at least a portion of the corrected caption data into an another language-based sign language;
generating the another language-based sign language animation based on the translated another language-based sign language; and
displaying the another language-based sign language animation.

8. A device for displaying caption data comprising:
a video receiver configured to receive content data including video data;
a display configured to display the video data; and
a controller configured to:
if original caption data is included in the content data, perform error checking for the original caption data and generate corrected caption data by correcting one or more errors of the original caption data,
extract one or more high-difficulty words from the corrected caption data,
generate explanation data corresponding to each of the one or more high-difficulty words, wherein the explanation data includes data for explaining each of the one or more high-difficulty words,
determine at least one special effect corresponding to at least one word included in the original caption data or the explanation data, wherein the at least one special effect includes vibrations, color light, heat, chill, or fragrance corresponding to the at least one word included in the original caption data or the explanation data, and
while displaying the video data, simultaneously provide the corrected caption data, the explanation data, and the at least one special effect.

9. The device of claim 8, wherein the controller is further configured to, if a user input for displaying a caption is received, control the display to simultaneously display the corrected caption data, the explanation data, and the at least one special effect.

10. The device of claim 9, wherein the controller is further configured to determine whether the one or more high-difficulty words are included in the corrected caption data that is displayed on the display.

11. A device for displaying caption data comprising:
a video receiver configured to receive content data including video data;
a display configured to display the video data; and
a controller configured to:

if original caption data is included in the content data, perform error checking for the original caption data and generate corrected caption data by correcting one or more errors of the original caption data, extract one or more high-difficulty words from the corrected caption data, generate a sign language animation corresponding to each of the one or more high-difficulty words, wherein the sign language animation includes explanation data for explaining each of the one or more high-difficulty words, determine at least one special effect corresponding to at least one word included in the original caption data or the explanation data, wherein the at least one special effect includes vibrations, color light, heat, chill, or fragrance corresponding to the at least one word included in the original caption data or the explanation data, and while displaying the video data, simultaneously provide the corrected caption data, the sign language animation, and at least one special effect.

12. The device of claim 11, wherein the controller is further configured to, if a user input for displaying a caption is received, control the display to simultaneously display the corrected caption data or the sign language animations.

13. The device of claim 12, wherein the controller is further configured to:
   determine whether the one or more high-difficulty words are included in the corrected caption data that is displayed on the display.

14. The device of claim 11, where the controller is further configured to:
   if a user input for displaying an another language-based sign language animation is received, translate at least a portion of the corrected caption data into an another language-based sign language,
   generate the another language-based sign language animation based on the translated another language-based sign language, and
   control the display to display the translated another language-based sign language animation.

15. The method of claim 1, wherein the one or more errors comprise at least one of a typographical error and a syntax error.

16. The device of claim 8, wherein the one or more errors comprise at least one of a typographical error and a syntax error.

* * * * *